(12) United States Patent
Nolan

(10) Patent No.: US 6,957,206 B2
(45) Date of Patent: Oct. 18, 2005

(54) COMPUTER SYSTEM AND METHOD WITH ADAPTIVE N-LEVEL STRUCTURES FOR AUTOMATED GENERATION OF PROGRAM SOLUTIONS BASED ON RULES INPUT BY SUBJECT MATTER EXPERTS

(75) Inventor: Darla K. Nolan, Lenexa, KS (US)

(73) Assignee: Quantum Dynamics, Inc., Omaha, NE (US)

( * ) Notice: Subject to any disclaimer, the term of this patent is extended or adjusted under 35 U.S.C. 154(b) by 504 days.

(21) Appl. No.: 09/838,638

(22) Filed: Apr. 19, 2001

(65) Prior Publication Data

US 2004/0015823 A1 Jan. 22, 2004

(51) Int. Cl.[7] ................ G06F 17/00; G10L 15/00
(52) U.S. Cl. ................ 706/47; 706/45; 704/257
(58) Field of Search ............... 706/47, 45; 704/257

(56) References Cited

U.S. PATENT DOCUMENTS

| | | |
|---|---|---|
| 5,123,057 A | 6/1992 | Verly et al. |
| 5,159,687 A | 10/1992 | Richburg |
| 5,167,005 A | 11/1992 | Yamakawa |
| 5,280,610 A | 1/1994 | Travis, Jr. et al. |
| 5,379,423 A | 1/1995 | Mutoh et al. |
| 5,452,468 A | 9/1995 | Peterson |
| 5,537,119 A | 7/1996 | Poore, Jr. |
| 5,542,420 A | 8/1996 | Goldman et al. |
| 5,544,352 A | 8/1996 | Egger |
| 5,544,650 A | 8/1996 | Boon et al. |
| 5,574,828 A | 11/1996 | Hayward et al. |
| 5,659,399 A | 8/1997 | Lin et al. |
| 5,721,911 A | 2/1998 | Ha et al. |
| 5,724,488 A | 3/1998 | Prezioso |
| 5,835,701 A | 11/1998 | Hastings |
| 5,856,931 A | 1/1999 | McCasland |
| 5,867,386 A | 2/1999 | Hoffberg et al. |
| 5,875,108 A | 2/1999 | Hoffberg et al. |
| 5,878,729 A | 3/1999 | Covert et al. |
| 5,905,987 A | 5/1999 | Shutt et al. |
| 5,924,090 A | 7/1999 | Krellenstein |
| 5,939,278 A | 8/1999 | Boon et al. |

(Continued)

Primary Examiner—George Davis
(74) Attorney, Agent, or Firm—Blackwell Sanders Peper Martin LLP

(57) ABSTRACT

A computer system (20) is provided with a development server (26) with a plurality of subject matter expert (SME) terminals (22) and a production server (28) with a plurality of user terminals (24). The development server (26) supports several software components including a knowledge database (46), a code generator (48), and fluid object material (50). The production server (28) also supports several software components including an production copy of the fluid object material (50A), and software wrappers (152,154). An instantiation modeler (156) and a user interface (44) are provided on the user terminals (24), and a SME interface (42) resides on the SME terminals (22). The SME interface (42) is operative to guide a SME through entry of rules into the knowledge database (46), and the code generator (48) is operative to automatically generate source code that is the fluid object material (50) for implementing the rules input into the knowledge database (46) by the SME. The production copy of the fluid object material (50A) is transmitted to the production server (28), and the instantiation modeler (156) is operable to instantiate a class into a morphable object. As a user enters information, the instantiation modeler (156) repeatedly morphs the morphable object into more mature objects and the user interface (44) changes to reflect the morphed object. The wrappers (152,154) are operable to permit the SME to update the rules and recompile the fluid object material (50) while the users interact with the user interfaces (44).

55 Claims, 16 Drawing Sheets

U.S. PATENT DOCUMENTS

| | | |
|---|---|---|
| 5,974,412 A | 10/1999 | Hazlehurst et al. |
| 5,999,106 A | 12/1999 | Buckler |
| 5,999,940 A | 12/1999 | Ranger |
| 6,038,668 A | 3/2000 | Chipman et al. |
| 6,073,170 A | 6/2000 | Sumita et al. |
| 6,078,924 A | 6/2000 | Ainsbury et al. |
| 6,101,491 A | 8/2000 | Woods |
| 6,154,738 A | 11/2000 | Call |
| 6,206,829 B1 * | 3/2001 | Iliff ............................ 600/300 |
| 6,219,719 B1 | 4/2001 | Graf |
| 6,278,996 B1 * | 8/2001 | Richardson et al. ........... 707/6 |
| 2002/0038213 A1 * | 3/2002 | Adachi ....................... 704/257 |
| 2004/0010484 A1 * | 1/2004 | Foulger et al. ............... 706/50 |

* cited by examiner

Object Model - Fluid Object Modeler (FOM)²

COMPUTER SYSTEM AND METHOD WITH ADAPTIVE N-LEVEL STRUCTURES FOR AUTOMATED GENERATION OF PROGRAM SOLUTIONS BASED ON RULES INPUT BY SUBJECT MATTER EXPERTS

COPYRIGHT NOTICE AND AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of computer programs providing customized solutions to programming needs wherein the customized solutions are developed from knowledge entered by a subject matter expert. More particularly, the invention relates to a modeler implemented by a computer program. The modeler is operable to develop and program, without the efforts of a computer programmer, customized software solutions based on rules input by the subject matter expert.

BACKGROUND OF THE INVENTION

Computers and computer systems have become an integral part of our lives both at home and at work, and their versatility seems limited only by the imagination of the computer programmers and the software engineers that design and program applications for operation on computers. Thus, computers are powerful and nearly indispensable tools capable of managing home finances and controlling complex production processes and equipment, and organizations frequently decide to utilize computer systems to achieve automation. Though the benefits of automation are significant, the computer systems implementing the automation are only as good as the system architects, designers, programmers, integrators, and testers, collectively known as software engineers that develop them. With so much depending on the skills of the software engineers and with the increasing proliferation of computers and computer systems, industry and even society has become dependent on increasingly scarce software engineers for implementation of automation. Indeed, an entire training industry has developed to meet the ever increasing need for skilled software engineers.

When confronted with the task of implementing automation, organizations frequently retain software engineers to develop and implement custom computer systems with custom software. As software engineers develop a custom system, they analyze the system requirements, architect the system, design the software, code the software, integrate the software, test the components and the system and operate and maintain the system. Typically, this is an iterative design process requiring extensive interaction between the software engineers and the subject matter expert (SME) or experts of the organization. As the software engineers and the SME repeatedly go through these iterations, they encounter numerous inefficiencies and problems inherent in the process. In the system analysis and design phases, the SME must work closely with the software engineers to define the problem. Essentially, the SME must convey all relevant knowledge to the software engineers. Obviously, there are many opportunities for miscommunication between the SME and the programmers or simply omission of pertinent information.

After the SME's knowledge is thought to be transferred, the software engineers begin hard designing and coding the software solution, integrate, and test it. The SME typically has no indication of how the project is going until the software engineers return a functioning program to the SME, and upon review, not surprisingly, the program may not completely or accurately accomplish the desired automation. Thus, the SME and software engineers again engage in the transfer of knowledge from the SME to the engineers, and this exchange may take place several times creating what is sometimes called a knowledge acquisition bottleneck. Each time the software engineer learns more from the SME, they must attempt to alter a system design that is already fixed. Depending on the complexity of the system and the quality of the design, this can range from difficult and time consuming to impossible. Thus, the custom design process is fraught with inefficiencies and problems leading, in many cases, to scheduling delays, unexpected cost increases, and perhaps even failure. Additionally, if after several years of use, changes need to be made to the software or system, the software engineers must be brought back, and the same iterative design process is performed. Therefore, custom development is a time intensive, expensive, and risky undertaking.

To avoid the expense and time involved while significantly reducing the risk in custom computer system and software development, many organizations look for software having industry wide applicability. Assuming such software is even available in a given industry, it implements "best practices" for the industry as determined by the software vendors and has limited adaptability and flexibility. Thus, the organization is forced to sacrifice automation of the unique features of its organization to save money. A sometimes less expensive alternative is to equip the SME with software tools such as spreadsheets and database management systems (DBMS). Once the SME learns how to use the software tools, the SME can develop solutions without the aid of a software engineer. However, the capabilities of these software tools are even more limited, and they typically cannot be integrated with other programs and software engineer support. Thus, assuming there is sufficient time and money, the most desirable option is custom development.

To reduce the cost of custom development and increase capabilities, many different programming languages have been developed including object oriented programming languages (OOPL). These OOPL languages have improved the capability and productivity of software engineers but have not reduced our dependence on such computer specialists to develop custom computerized applications. The same is true for computer aided software engineering (CASE) tools, which have given way in popularity to integrated development environments (IDE). These CASE/IDE tools have provided limited productivity improvements to software engineers by providing the capability to create integrated work environments for teams of software engineers and producing code skeletons or outlines. However, these tools are used by software engineers who must still translate requirements from the SME and hard code in the flesh (logic and rules) of the program. Thus, neither CASE/IDE nor OOPL have reduced reliance on software engineers or improved the inefficiencies encountered when transferring knowledge from the SME to software engineers.

Expert systems also provide assistance to software engineers. Generally expert systems perform a task, such as a medical diagnosis, that would otherwise be performed by a human expert. Expert system shells provide the pre-coded expert system components, such as the inference engine, which utilizes conventional backward and forward chaining approaches. However, such expert system inference engines are not versatile enough for applications that are unrelated to what they were originally created for. Further, to implement an expert system shell, a software engineer hard codes in the knowledge, and the software engineer must still work through the knowledge acquisition bottleneck to obtain that knowledge from an expert in the field. Hence, these expert systems are also not scalable across a wide array of knowledge domains without creating enormous complexity.

Thus, a need exists for a software program having a user friendly interface and which enables a SME to develop a scalable custom software solution for a wide variety of complex automation projects, rather than requiring the services of software engineers. Further, a need exists for a software program that can be updated and revised by a SME without assistance from software engineers. More specifically, a need exists for a software program utilizing a model centric strategy providing fluid, that is readily changeable, objects which model problem solution processes in real time.

BRIEF SUMMARY OF THE INVENTION

There is, therefore, provided in the practice of the invention a novel computer system containing a computer readable medium with instructions for providing a subject matter expert interface that is operable to enable a subject matter expert (SME) to enter and develop rules for modeling a solution process or processes that are part of a desired automation effort. The instructions also provide for generation of fluid object material based on the rules as developed by the subject matter expert without the assistance of a software engineer. The instructions also provide for a user interface based on the morphable objects. While previously available programs simply apply preprogrammed code algorithms to data, the present invention is operable to actually develop the code algorithms for application to user information.

Preferably, the fluid object material is operable to develop a class and instantiate the class into a morphable object based on rules input by the SME. The preferred computer system also includes a knowledge database operable to store the rules input by the subject matter expert through the subject matter expert interface. Through the use of empty fields, the SME interface guides the SME through the entry of variables, templates, references, and events, in order to develop the rules which model the solution process. A code generator then injects blank cells and blank contexts with the rules input by the SME developing the fluid object material, which will instantiate into the morphable objects. An instantiation modeler operates to instantiate and morph the morphable objects as the user enters information.

Preferably, a plurality of morphable classes is provided in the automatically generated code, and the morphable classes form coded cells and coded contexts. The instantiation modeler repeatedly instantiates the morphable classes into morphable objects as the user enters known information, and the instantiation modeler repeatedly morphs the morphable objects into progressively more mature morphable objects until a solution is achieved. As the objects morph, the preferably dynamic user interface also preferably changes.

The fluid object material is also preferably provided with a wrapper operable to permit the SME to pause operation and update the rules. Preferably, the SME is able to enter, develop, and change rules while users are interfacing with the instantiation modeler and user interface to obtain solutions to given problems within the domain of the modeled solution process. After the SME has completed revisions to the rules and generated a revised code, the operation of the instantiation modeler and user interface are briefly paused while the compiled code of the fluid object material is updated. Thus, while prior art software programs would have to be re-coded by a software engineer, the SME is enabled to introduce new rules into the system, and the modeler develops new code algorithms, that is, morphable classes/coded cells, and coded contexts, for the new rules.

The code generator, which preferably resides on a development server, is operable to generate the code in a single routine or in distinct segments as directed by the SME. Once the SME instructs the code generator to generate code, the code generator performs code generation automatically and without any input from a software engineer. The code generator takes the SME's knowledge from the knowledge database and codes blank cells and blank contexts to create coded cells and contexts of the fluid object material. Similarly, the fluid object material and the instantiation modeler perform their respective functions automatically, so that no software engineer is needed. Preferably, the fluid object material resides on both a development server and a production server, and the instantiation modeler resides on a user terminal. The modeler wrapper preferably resides on the production server. The development server, production server, and user terminal are in operative communication preferably over a local area network (LAN).

The invention includes additional inventive aspects. For example, a plurality of abstraction levels are provided in the fluid object material, and a data structure utilizing a plurality of morphable objects coded with metadata and processed metadata, provide a computer program implemented modeler that is fully scalable and adaptable to model substantially any solution process. Another example of an inventive concept enabling this powerful modeling program is inheritance from one template to another. Preferably, there are at least six levels through which templates may inherit from each other and result in the generation of code based on the templates. In the preferred embodiments, a data structure is provided for modeling the solution process and includes first and second levels of metadata where the second level of metadata is about the first level of metadata. Preferably, at least six metadata levels are utilized in the fluid object material. In one specific embodiment, the first level of metadata comprises entry fields and the second level of metadata comprises buckets into which the entry fields are populated.

Accordingly, it is an objective of the present invention to provide an improved modeling program capable of modeling, without the assistance of software engineers, almost any solution process based on rules input by a SME and user input.

BRIEF DESCRIPTION OF THE DRAWINGS

These and other inventive features, advantages, and objectives will appear from the following Detailed Description when considered in connection with the accompanying drawings in which similar reference characters denote similar elements throughout the several views and wherein.

DETAILED DESCRIPTION OF THE PREFERRED EMBODIMENTS

Figure 1:
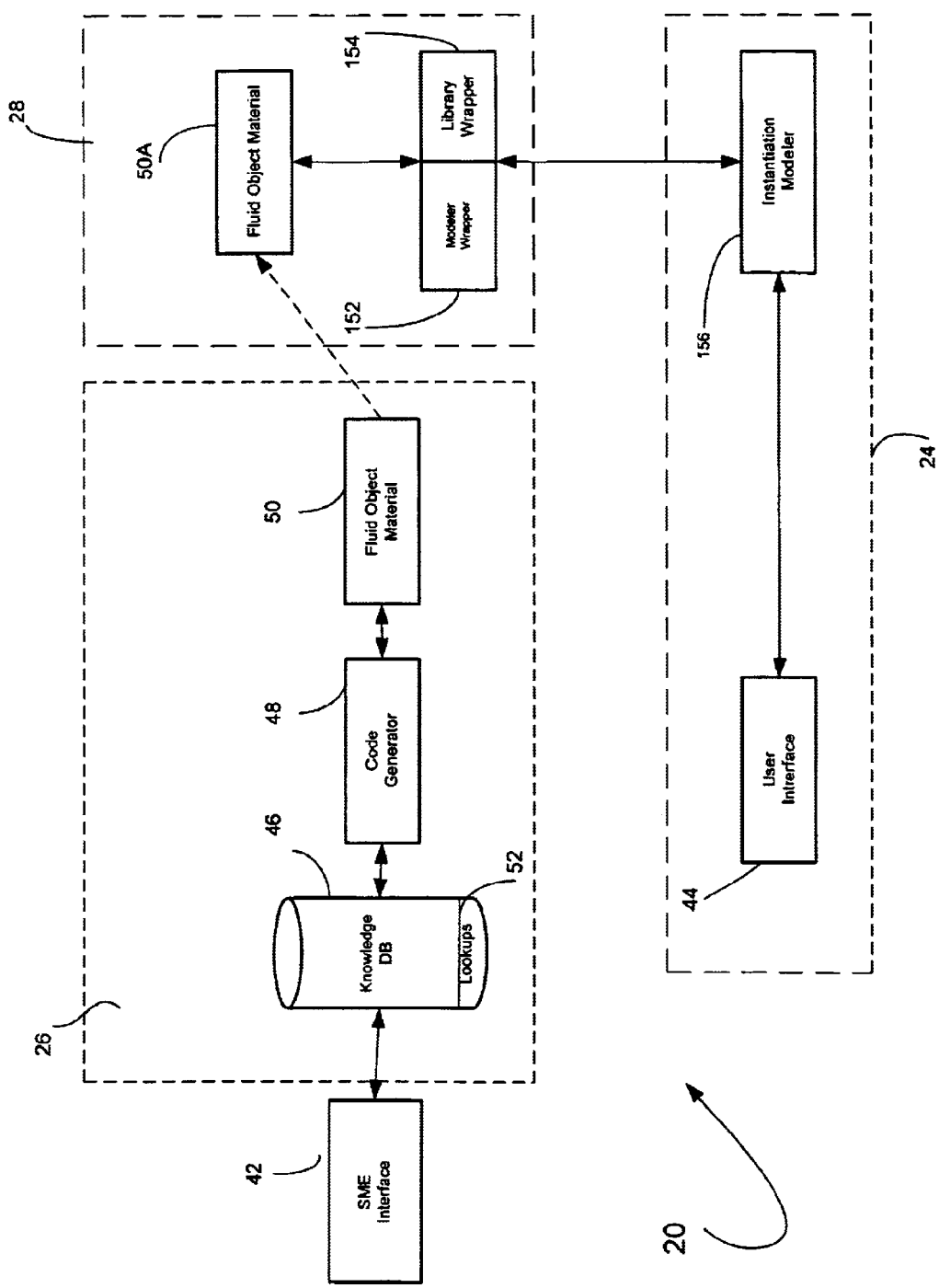
FIG. 1 is schematic block diagram illustrating components of the computer system implemented modeler according to the present invention.
Figure 2:
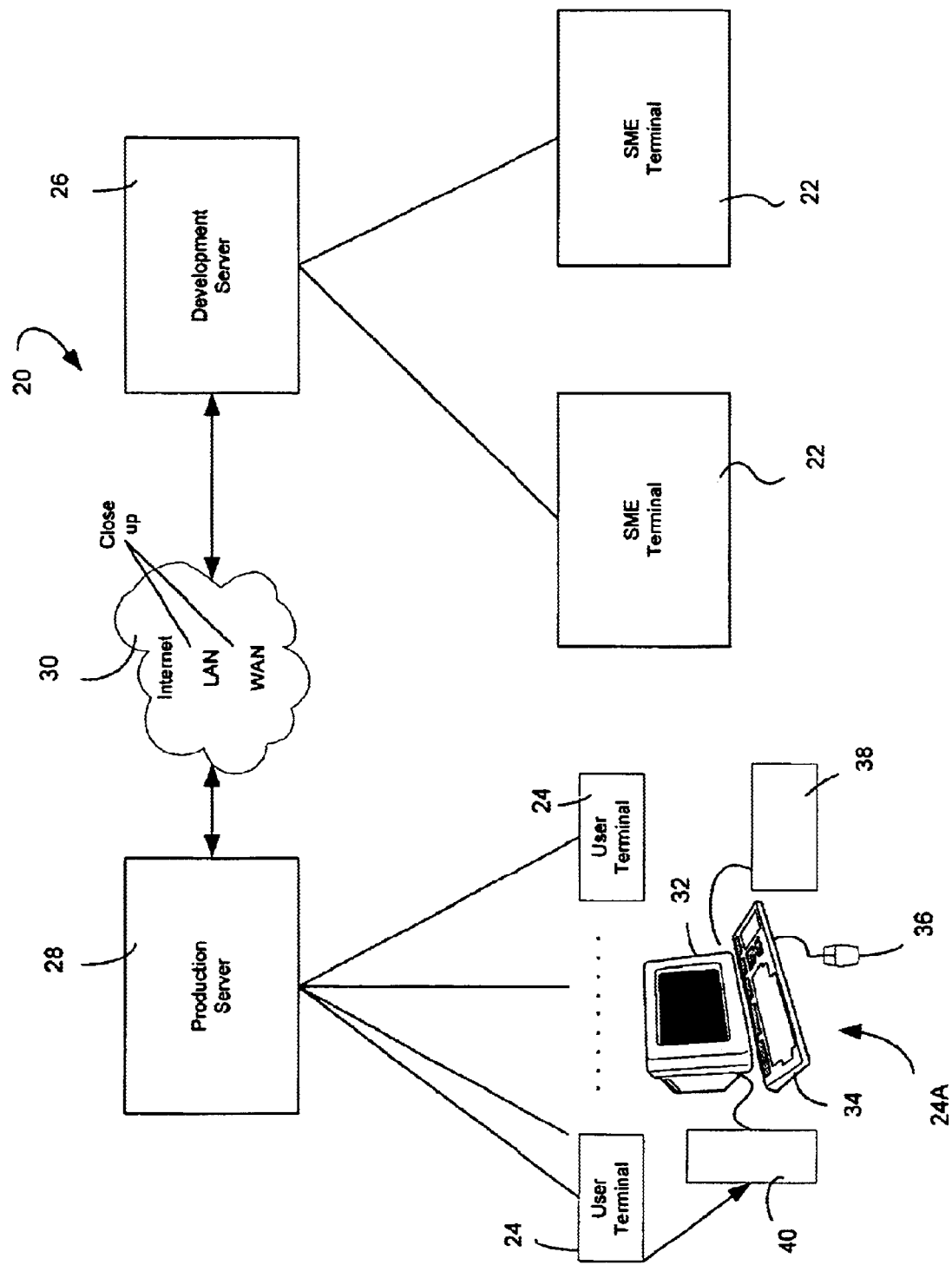
FIG. 2 is a schematic block diagram illustrating the hardware components of the computer system of FIG. 1.

Referring to the drawings in greater detail, FIGS. 1 and 2 show a computer system 20 constructed in accordance with a preferred embodiment of the present invention. The computer system 20 broadly includes a plurality of subject matter expert (SME) terminals 22, a plurality of user terminals 24, a development server 26, and a production server 28. The development server 22 and production server 26 are in operative communication through a desired communication medium 30. The computer system includes program instructions that enable SME's, without the assistance of software engineers, to develop custom software solutions for automation projects.

The SME terminals 22 and user terminals 24 are substantially similar and will be described with reference to a single user terminal 24A illustrated in FIG. 2. Generally, the hardware and software components of the terminals 22, 24 and servers 26, 28 are selected based on system requirements for specific automation projects, and it should be understood that as improved hardware and software components are developed, they can be incorporated into the computer system 20 as desired. The user terminal 24A includes a monitor 32, keyboard 34, relative pointer (mouse) 36, and desired peripheral devices such as a printer 38. The computer housing 40 contains the necessary hardware (not shown) including, but not limited to, a central processing unit (CPU), hard drive (storage), memory, and communications apparatus. The number of user terminals 24 varies based again on the project requirements. One preferred system includes approximately thirty-five (35) user terminals 24 with the production server supporting concurrent use on ten (10) of the terminals 24. Fewer SME terminals are provided, with a preferred system including three (3) SME terminals 22. Preferably, the development server 26 supports concurrent use on all SME terminals 22.

The terminals 22, 24 also include the necessary software components for operation. For example, each terminal includes an operating system (OS). The preferred OS is Windows NT. The SME terminals 22 provide a platform for operation of a SME interface 42 delivered by the development server 26, and the user terminals 24 provide platforms for operation of a user interface 44 delivered by the production server 28. The interfaces 42, 44 are preferably dynamic graphical user interfaces (GUI) with which the SMEs and users interact to receive and input information. The interfaces 42, 44 will be illustrated and described in more detail in connection with the exemplary automation project for window blinds described below. It should be understood that while the example given is in the context of business rules, the present invention has applicability to any kind of rules, such as academic, scientific, design, and others.

The servers 26, 28 preferably have similar hardware components and can operate as stand alone terminals. However, the hardware components are preferably more robust. For example, the CPUs used in the servers are faster, and the memory and storage are increased. Additionally, the servers 26, 28 include the necessary communications apparatus for communication through the desired communications medium 30. The communications medium 30 can comprise a LAN, WAN, VPN, Internet, or wireless medium depending again on the project requirements.

The development server 26 utilizes and supports a knowledge database 46 and a plurality of software components including an OS, preferably Windows NT and component object model (COM) (not illustrated). The software components also include a code generator 48, and fluid object material 50 shown in detail in FIG. 6.

Figure 3:
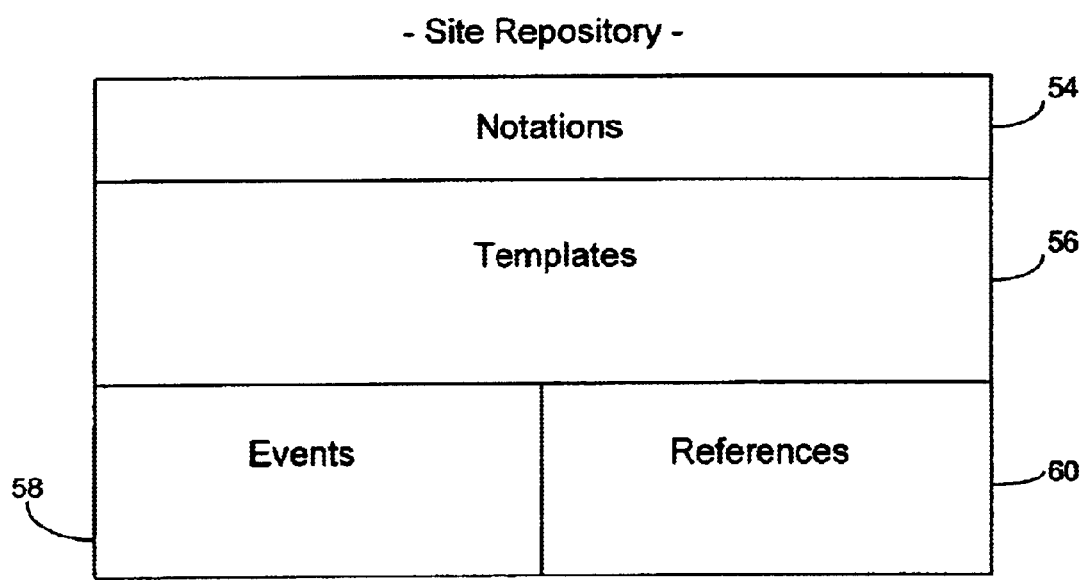
FIG. 3 is a schematic diagram of the site repository including SME entered rule components for use in the modeler of FIG. 1.
Figure 4:
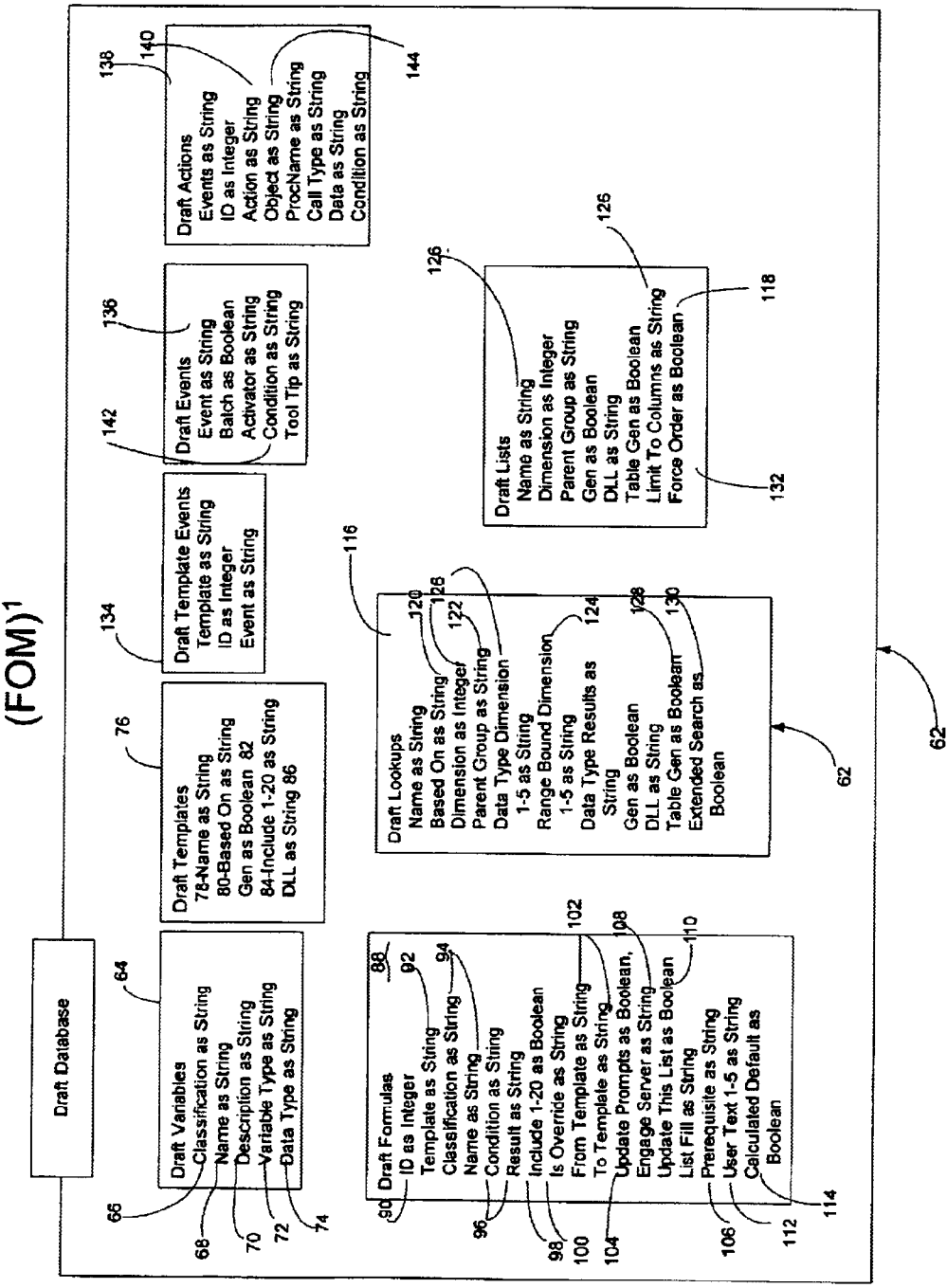
FIG. 4 is a class diagram of a knowledge database for use in the modeler of FIG. 1.

Referring to FIGS. 3 and 4, the knowledge database 46 is preferably relational and managed by a SQL server database management system (DBMS). The knowledge database 46 includes rules input by the SME and lookups 52 (FIG. 1) in the form of lists and tables. Further, new and revised rules can be developed by recursion. If desired, the lookups 52 can be stored on a separate database. Generally, the SME interface 42 is operable to guide the SME through entry and development of the rules required to develop custom software solutions for automation projects, and the knowledge database is operable to automatically store the rules. The rules are entered in four primary components illustrated in the site repository of FIG. 3: notations or variables 54, templates/equations 56, events 58, and references 60. The variables 54 are like a data dictionary, and the templates 56 generally provide for the entry of equations utilizing the variables 54. The events 58 enable action to be taken upon occurrence of a defined event. In the area of workflow, for example, when the supply of a raw material is reduced to a predetermined level (trigger), a purchase order for the raw material is printed for issuance (action), and an email is transmitted to the vendor (action). The two actions make up an event. The references 60 include information that needs to be looked up, so the references 60 are simply tables and lists in the lookups portion 52 of the knowledge database 46. These rule components 54–60 are entered into empty fields provided by a draft database 62 illustrated in FIG. 4. The draft database 62 and other class diagrams include numerable fields, which are descriptive or can be understood by one skilled in the art without undue effort. Therefore, only exemplary fields will be specifically described to illustrate the features of the computer system 20, and other features of the computer system will be described generally without reference to specific fields. Further, fields carrying through to other class diagrams or used in other blocks, generally will not be described again.

In a method of writing code according to the present invention, the relational database 46 (FIG. 1) stores segments of code. This enables searching, filtering, sorting, combining, and other manipulations of the segments of code, which are representative of the variables 54, templates 56, events 58, and references 60.

The variables 54 are input in the draft variables block 64 using a two piece metadata structure including a "classification" field 66 and a "name" field 68. The classification field 66, typically an adjective, allows the SME to define the variable by its characteristic such as width or color. The "name" field 68, typically a noun, allows the SME to designate what the characteristic applies to such as a rail. The term rail and other terms used in connection with window blinds will be described below in connection with the exemplary business automation project. Note that the empty fields are being filled with metadata not actual data; that is, the actual data, such as a twenty (20) inch width, is irrelevant to the variable. This characteristic is found consistently throughout the draft database. Thus, the draft database is model centric and could be viewed as data irrelevant except to the extent that it is being prepared to receive actual data.

The two piece metadata structure allows the variables to pivot relative to the characteristic or the noun on the basis of metadata instead of data. Thus, after all variables are input, the SME can quickly view all the variables pertaining to the rail such as rail color and rail width, and then the SME can pivot/sort to quickly view all the variables pertaining to width, such as rail width and slat width. The "description" field 70 is simply a place for the SME to enter additional information about the variable. The "variable" type 72 is simply entered as independent/entry, dependent/result, or constant. The "data type" 74 is just what kind of data is going to be entered for the variable by a user. It could be, for example, string, double, long, integer, or single.

With continued reference to FIGS. 3 and 4, the templates 56 are input in the draft templates block 76. There is a "name" field 78, similar to the name field 68 of the draft variables block 64, and an inheritance field 80 called "based on". The based on field 80 allows the SME to draw on previously developed templates for formulas or events. Preferably, the SME is enabled to use as many as six (6) inheritance levels. However, additional inheritance levels up to n levels can be provided as required by specific automation efforts. In an abstract example, the SME develops a first template named "one." The SME then develops a second template named "two" and enters the string "one" in the "based on" field 80. Thus, the second template inherits from the first template. Similarly, a third template named "three" would have "two" in the based on field. A fourth template named "four" would have "three" in the based on field 80. A fifth template named "five" would have "four" in the based on field 80, and a sixth template named "six" would have "five" in the based on field 80 to complete the fifth inheritance level. The SME is also enabled to have a plurality of templates inheriting from a single template. In the example given, the third template named "three" would have "one" in the based on field 80.

The draft templates block 76 also includes a "gen" field 82, an "include 1–20" field 84, and a "DLL" field 86. The gen field 82 receives a "yes or no" (true or false) indicator. If the SME is working on an incomplete template, the gen field 82 is set to "no", so that the next time the SME generates code, the incomplete template is not utilized in that code generation. The include 1–20 field 84 enables the SME to specify routings for data and metadata, and thus ultimately actual data, into as many as 20 buckets. As the SME drafts the templates, the SME can define new buckets by entering a new bucket name in one of the open spaces provided by the include 1–20 field 84. The SME can also route the metadata into existing buckets, which were defined in previous templates, by entering the bucket name in another of the open spaces provided by the include 1–20 field 84. The DLL field 86 allows the SME to group the templates into specific solution processes. In a given automation project, there may be many solution processes that must be modeled. If desired, the SME can enter all the knowledge for all the solution process and generate a single code segment. Alternatively, as the SME enters knowledge by developing templates, the SME can group together all the templates necessary for modeling a first solution process named "one" by entering the name "one" in the DLL fields 86 of those templates. Similarly, the SME can group together all the templates necessary for modeling a second solution process named "two" by entering the name "two" in the DLL fields 86 of that second group of templates. Thus, when code is generated, several distinct segments of code are generated. This can reduce compile time, and when revisions are necessary, only the affected segment of code is regenerated and replaced.

With the variables and templates to put them in defined, the draft formulas block 88 enables the SME to input what should be done with the variables. That is, the SME can input equations or formulas, which will ultimately take a user from the entry variables to the result variables to solve a problem that is within the domain of the modeled solution process. The "ID" field 90 is simply an integer identifier for the formula. In the "template" field 92, the SME enters the template name to which the formula applies, and the "classification" and "name" fields, collectively 94, link the formula back to the variables. The "condition" and "result" fields 96 enable entry of the actual formula in the form of a condition or "if" statement and a result or "then" statement. The "include 1–20" field 98 enables the SME to route, if appropriate, the result to the buckets named in the "include 1–20" field 84 of the template.

The "is override" field 100 of the draft formulas block 88 enables the computer system to perform metadata processing as opposed to data processing. This feature, and others like it, makes the draft database 62 model centric. The SME can put one of three values into the is override field 100: "N" for no, "R" for replace, or "A" for append. If the R-value is used, the metadata is replaced with the actual data. If the A-value is used, the actual data and/or metadata is added to the existing metadata, and if the N-value is used the metadata is unchanged. For example, if the user enters a specific family (model) of blinds and there is only one type of material, such as 8-gauge coil, that is used to make the rail for that blind family, the SME can take the metadata rail and replace it with the more defined metadata 8-gauge coil by entering R in the is override field 100 thereby redefining the metadata to another level. When the user enters a color for the blind, the material type cannot be replaced or otherwise lost. Instead, the color should be added to the metadata. To accomplish this, the SME enters the A-value in the is override field 100 for the color formula, and the metadata is appended to 8-gauge coil: color. Thus, this feature allows the metadata to be morphed and/or appended to the Nth level, and the R-value and A-value permit metadata processing at the same time as actual data processing. Further, the R-value and A-value allow the system to operate more quickly and utilize less system resources because unnecessary levels of abstraction are removed.

The draft formulas block 88 also includes "to template" and "from template" fields 102, which pertain to run time inheritance. These to and from template fields 102 enable the program to push and pull data such as customer information as the user enters, for example, the customer name or identification number.

Still referring to FIGS. 3 and 4, the "update prompts" field 104 and "prerequisites" field 106 of the draft formulas block 88 enables the SME to set prerequisites for requesting and obtaining more information from a user. This enables morphing by evaluating a prerequisite and by adding one or more information requests based upon the prerequisite being met. Thus, before the user is needlessly presented with a large number of blank entry spaces for entry variables, the system will confirm that the necessary prerequisites have been met for displaying those blank entry or display spaces for the entry variables. Therefore, the update prompts field 104 and the prerequisites field 106 enable the SME to determine when an object needs to morph to include fields for receiving additional information from the user. Specifically, the SME sets the update prompts field to true/yes if the data point is used in any prerequisite. Preferably, this field is automatically filled in for the SME when the data point is referenced in the prerequisite field 106 of another data point. This feature of the knowledge database 46 also illustrates the metadata manipulation characterizing this modeler. Specifically, the metadata is whether any prerequisites are necessary for displaying metadata such as an entry variable. Thus, two metadata levels are illustrated. Further this feature of the knowledge database 46 illustrates how the modeler is operable to morph during real time. In this example, an object would morph and subsequently the dynamic user interface 44 would change to include the requests for the entry variables when the prerequisites are confirmed.

The draft formulas block 88 also includes an "engage server" field 108 and an "update this list field" 110. The update this list field 110 provides another way that an object will morph and subsequently the dynamic user interface 44 will change. When appropriate, the SME enters a true value in the update list field 110, and when the user changes or enters information, a different list is pulled to the object. For example, if the user initially selects blind family one having available colors 1–10 and then changes to blind family two having available colors 11–20, the object would morph replacing the list of colors 1–10 with the list of colors 11–20. The dynamic user interface would also change, so that the new list would replace the old list in a pull down window. If necessary, the SME sets the engage server field 108 to true enabling the modeler 50 to go back to the production server 28 for the list or other metadata.

The remaining fields provide the SME with further options for entering the rules. For example, "user text 1–5" field 112 enables the SME to provide for special information such as client billing requirements, and the "calculated default" field 114 enables the calculation of a default based on previous conditions.

The draft database 62 also includes a draft lookups block 116 and a draft lists block 118, which correspond to the references 60. The "dimensional type" fields 126 of the lookups and lists blocks 116, 118 enable the SME's to create their own topology of how the data will be stored. The draft lookups block 116 is also provided with inheritance capabilities through the "based on" field 120. A "parent group" field 122 enables the SME to set up a hierarchy among the lookups. The "range bound dimension 1–5" field 124 allows the SME to leave the lookup unbounded, give it an upper bound or a lower bound. Thus, in a pricing lookup, the SME could set prices for drops of the blinds and set the range bound field 124 to be a lower bound. If, hypothetically, two drops for a blind are three (3) feet and five (5) feet, the price for the three foot blind would apply all the way up to five feet. That is, a blind having a drop from three feet to 4.99 feet would have the price associated with the three (3) foot blind in the lookup. A "table gen" field 128 enables the SME to decide whether the table will be generated as a DLL or provided by access to a relational table. It automatically generates SQL statements and automatically goes to the backend tables enabling revision of live tables without recompiling them. Thus, the SME is not limited by any particular database structure, and is enabled with the ability to set data relationships, which were previously only made possible by consuming an unacceptable large amount of storage or hard coding the relationships. This gives the SME the freedom to set whatever topology is best for the underlying data store and select the desired data retrieval method.

An "extended search" field 130 enables the SME to perform a best match search, which, for example, will perform a search of the entire database to determine the largest discount to which a customer is entitled. If the SME enters a true indicator in the extended search field 130, the program finds the last data point that fits. Specifically, it finds one record and uses it as the default; it finds another better record and overrides the previous, and then it finds a still better record and again overrides the previous. Thus, it actually performs a sequential table search from top to bottom.

The fields of the draft list block 118 have generally been described in connection with the draft lookups block 116. The "name" entered in the name field of the draft list block 118 would be entered in the list fill field of the draft formulas 88 for use by a formula. A "force order" field 132 allows the SME to choose between the order in which the list is entered or automatic alphabetization.

The events 58 are input utilizing a draft template events block 134, a draft events block 136, and a draft actions block 138. The fields of the events blocks 134–138 enable the SME to model "actions" 140 that need to occur when a given "condition" 142 occurs. As desired by the SME, multiple actions can be incorporated into a single event. Specifically, this feature enables the SME to input the rules that model workflow. For example, the condition 142 is a raw material being reduced below a predetermined level; the action 140 is printing, and the "object" 144 of that action is a purchase order. Another action might be sending an email to a responsible individual.

Figure 5:
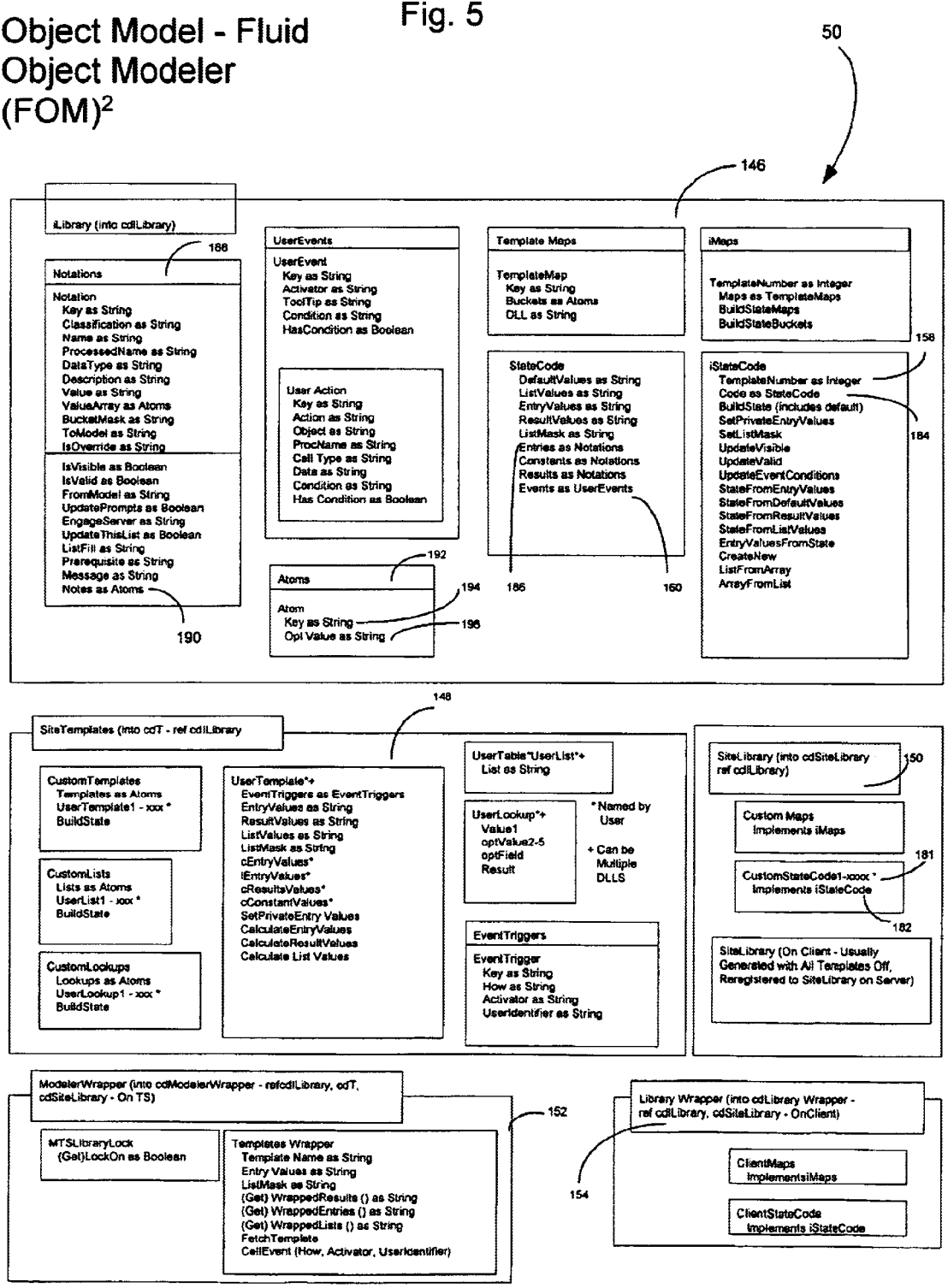
FIG. 5 is a class diagram of fluid object material for use in the modeler of FIG. 1.

Referring to FIGS. 1 and 5, the code generator 48 is a DLL file with instructions operable to generate the fluid object material 50. The fluid object material 50 in an uncoded form resides in the language of the code generator 48. The code generator is operable to generate the source code, preferably in Visual Basic (VB) implementing the fluid object material 50. If the SME has named the DLL fields 86 (FIG. 4) for discrete applications within the solution process, the code generator is operable to generate separate code segments located in separate DLL files. The code generator is operable to automatically generate the code upon indication by the SME. Automatically, as used throughout this application and in the claims means that no further, SME, user, or software engineer input is required other than perhaps an indication by the SME or user to perform the task such as by clicking an icon on a tool bar.

Referring to the class diagram of the fluid object material 50 shown in FIG. 5, the fluid object material 50 includes an interface library 146, site templates 148, and site library 150. A production copy of the fluid object material (50A) (FIG. 1) is also provided with a modeler wrapper 152 and a library wrapper 154. The fluid object material 50 first resides in the code generator 48 in an uncoded form containing blank cells and blank contexts. The interface library 146 is an uncoded cell operable to handle entry variables. The site template 148 is an uncoded context operable to handle the result variables. After the code generator 48 (FIG. 1) operates, a separate DLL file containing the fluid object material 50 resides on the development server 26. The fluid object material then includes coded cells and coded contexts. That is the blank cells and contexts have been injected with the SME's knowledge. Each coded cell comprises a plurality of morphable cell objects, and each coded context comprises a plurality of morphable context objects. Specifically, the site library 150 is a collection of coded cells.

In generating the source code, the fluid object material 50 recursively passes over the draft database 62 (FIG. 4). Thus, the fluid object material 50 is operable to develop morphable objects almost completely comprised of metadata, that is based on the rules input by the SME through the SME interface 42. This is a data mapping process in which many of the fields from the draft database 62 are mapped into the fluid object material 50.

Figure 6:
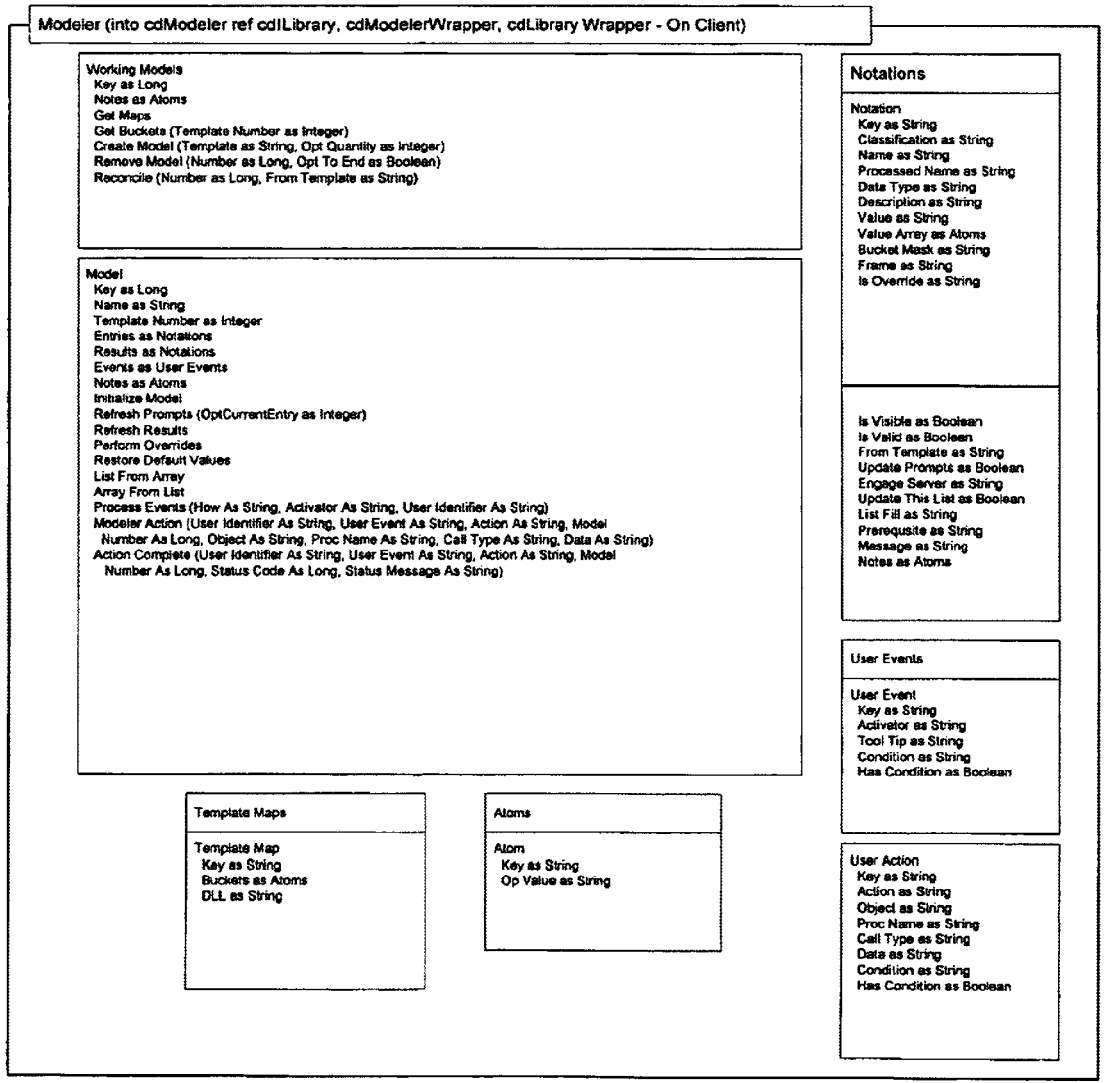
FIG. 6 is a class diagram of an instantiation modeler for use in the modeler of FIG. 1.
Figure 7:
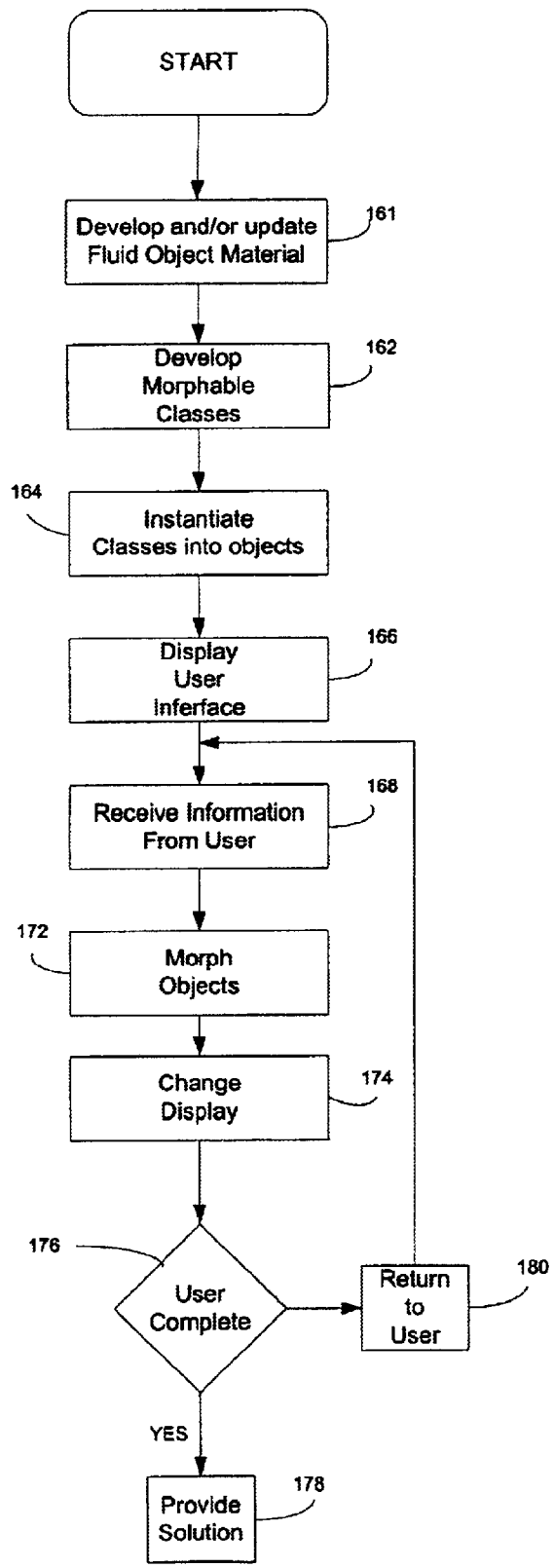
FIG. 7 is a schematic flow diagram illustrating the morphing and instantiation of morphable objects as information is input by a user.

Referring to FIGS. 5, 6, and 7, the production server 28, like the development server 26, includes a plurality of software components including an OS, preferably Windows NT. The production server 28 also includes an instantiation modeler 156 (FIG. 6) operable to instantiate the morphable objects developed by the fluid object material 50A. The coded fluid object material 50, in the form of one or more DLL files, is transmitted to the production server 28 for operation thereon and thereby creating the production copy of the fluid object material 50A. Thus, referring again to FIG. 1, the fluid object material 50 and its components are replicated on the production server as fluid object material 50A, while the wrappers 152, 154 simply reside on the production server. At step 161, the fluid object material 50A is developed or updated as required by SME input rules. The morphable objects are developed at step 162 by the fluid object material 50A and are instantiated at step 164 by the instantiation modeler 156. The user interface 44 is operative to display blank entry and/or display spaces at step 166 to guide the user through entry of known information into the morphable objects. The user interface utilizes some VB in cooperation with the instantiation modeler to develop and change the user interface. The fluid object material 50A includes an instantiation state code block 158 and a state code 160 with the fields required for receiving the instantiated objects with the user input information from the instantiation modeler 156.

Upon receipt of the instantiated objects and after the user inputs a piece of known information at step 168, the fluid object material 50A and instantiation modeler 156 morph the objects at step 172 into mature morphable objects based on the information input by the user. The user interface then changes at step 174, for example, by adding blank entry or display spaces and removing other blank entry or display spaces based on the piece of information. The user interface can also change by pulling in different content (lists and tables) for pop up and pull down windows. Additionally, the user interface may have previously blank entry spaces filled in with options or calculated defaults based on input information. It is also possible that some pieces of information input by the user will not require the user interface to change. If the user is complete, decision block 176, the program renders the solution 178. If not, the program returns 180 to receive additional information from the user. The user then enters another piece of information, and the objects are again morphed into more mature morphable objects based on the previously instantiated objects and the other piece of information. This process of morphing and interface change occurs repeatedly as the user inputs known information until the user has received a solution to the problem. Further, the steps of developing morphable objects, morphing objects, instantiating objects, and display changing are performed automatically.

When, for example, a customer has completed ordering one product and wants to order another, the modeling process illustrated in FIG. 7 will begin again. The instantiation modeler will instantiate a morphable object containing the knowledge base for the new product. Thus, the instantiation modeler 156 is operable to repeatedly instantiate objects for the solution process.

The modeler wrapper 152 and library wrapper 154 facilitate communication between the various software components of the system. The wrappers 152, 154 are operable to pause operation of the fluid object material 50A and the instantiation modeler 156 for updates to the rules. When it is necessary to make revisions, corrections, or updates to the rules because of previous errors or new requirements, the SME goes back to the SME interface and adds, changes, or deletes variables, templates, events, and/or references of the site repository (FIG. 3). Preferably, and assuming the changes are not major, the user interface operates simultaneously with the SME interface, so that the SME can revise the rules and recompile the fluid object material 50 without interfering with user operations. Once the fluid object material 50 is recompiled, the wrappers are operable to briefly pause system operation and transfer the revised fluid object material, so that the revised fluid object material is written over the previous fluid object material 50A residing on the production server 26. The production copy of the fluid object material 50A then develops revised morphable objects and the same instantiation, morphing, and display change steps follow. Thus, the fluid object material 50A includes collections of properties including metadata, data, processes, and designs operable to instantiate and morph the fluid objects.

Referring to FIGS. 1 and 5, another feature of the fluid object material 50 is its capablity of abstracting to at least the sixth level, in its current embodiment, in order to model the solution process. However, additional abstraction levels, up to n levels, can be provided as required by specific automation efforts. This will be explained in the context of fields responsible for instantiation. The site library 150 contains the "custom state code" 181, which is the first level of abstraction. The custom state code 181 contains the field "implements istate code" 182. This is the second level of abstraction. The instantiation state code block or istate code block 158 is the third level of abstraction, and it includes a code as state code field 184. The "code as state code" field 184 maps to the state code block 160, which is the fourth level of abstraction. The state code block 160 includes the field "entries as notations" 186, which maps to the notations block 188 providing a fifth abstraction level. The notations block 188 includes a "notes as atoms" field 190, which maps to an atoms block 192 providing a sixth abstraction level. As required by the solution process additional levels of abstraction are utilized.

The atoms block 192 also illustrates another morphing feature of the computer program implemented modeler according to the present invention. An atom can take on two different constructs. First, it is possible to only fill in the "key" field 194, so that it is a list of keys. The atom 192 can then morph to a table when the SME enters or the modeler automatically fills the "optional value" field 196. Thus, a single object model is provided that can become what it needs to be based on the rules input by the SME.

Figure 8:
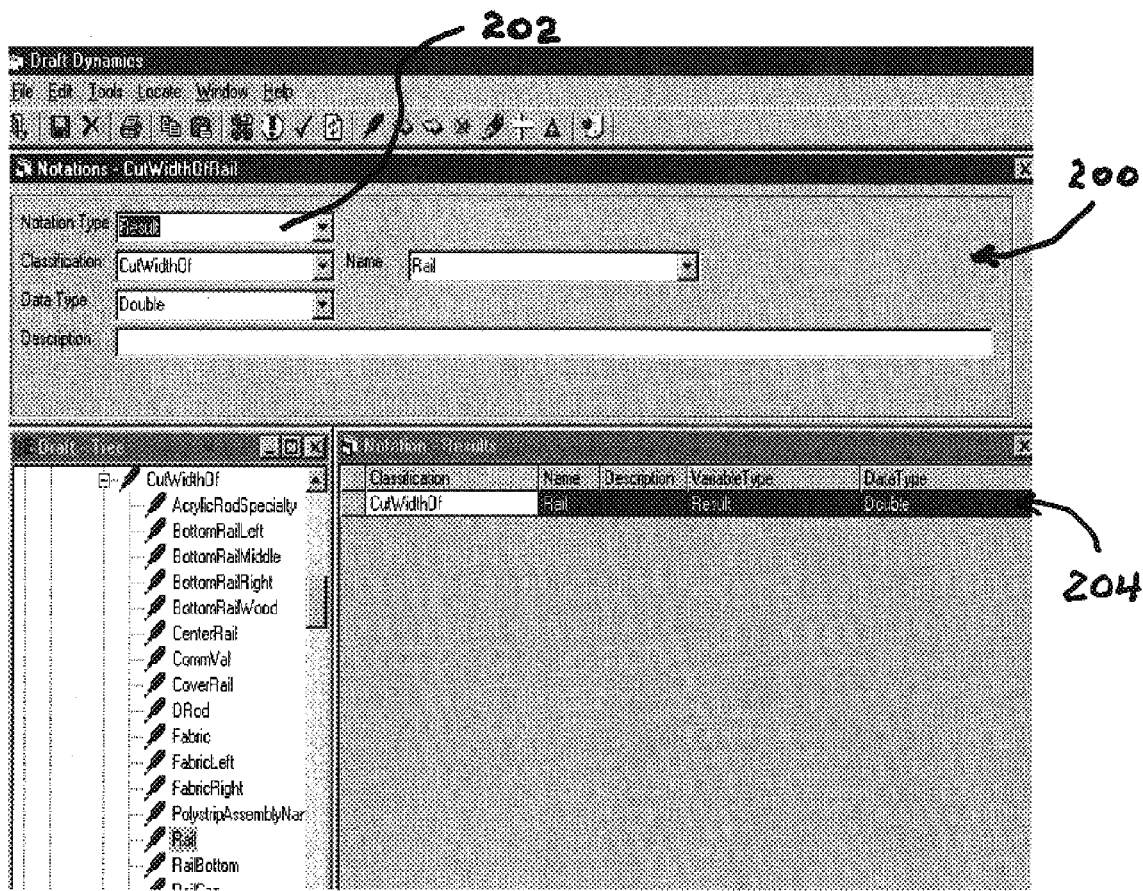
FIG. 8 is an exemplary screen shot of a SME interface of the modeler of FIG. 1 and illustrating a variable interface.

Referring to FIGS. 8 through 14, which will be discussed briefly in turn, some aspects of the exemplary window blinds business automation project will be shown and described. Window blinds basically include slats, cords, wands, and a rail. The rail is the top cross member that mounts to the wall near the top of a window. In FIG. 8, the SME is able to enter knowledge about a variable into a variable interface 200 having blank entry or display spaces 202 corresponding to the fields 66–74 of the draft variables block 64 (FIG. 4). Through the variable interface 200, the SME is able to enter, for example, the name and classification fields 66, 68 of the variable. FIG. 8 also illustrates the pivoting feature. In the listing 204 of FIG. 8, the variables are sorted by the metadata classification "cut width of." Thus, all the variables with that classification are displayed. Alternatively, the SME could pivot by the metadata name "rail" to display all of the variables with that name including classifications such as "color of" and "quantity of." The list allows the SME to review all variables previously entered and draw on previously entered knowledge in defining new variables.

Figure 9:
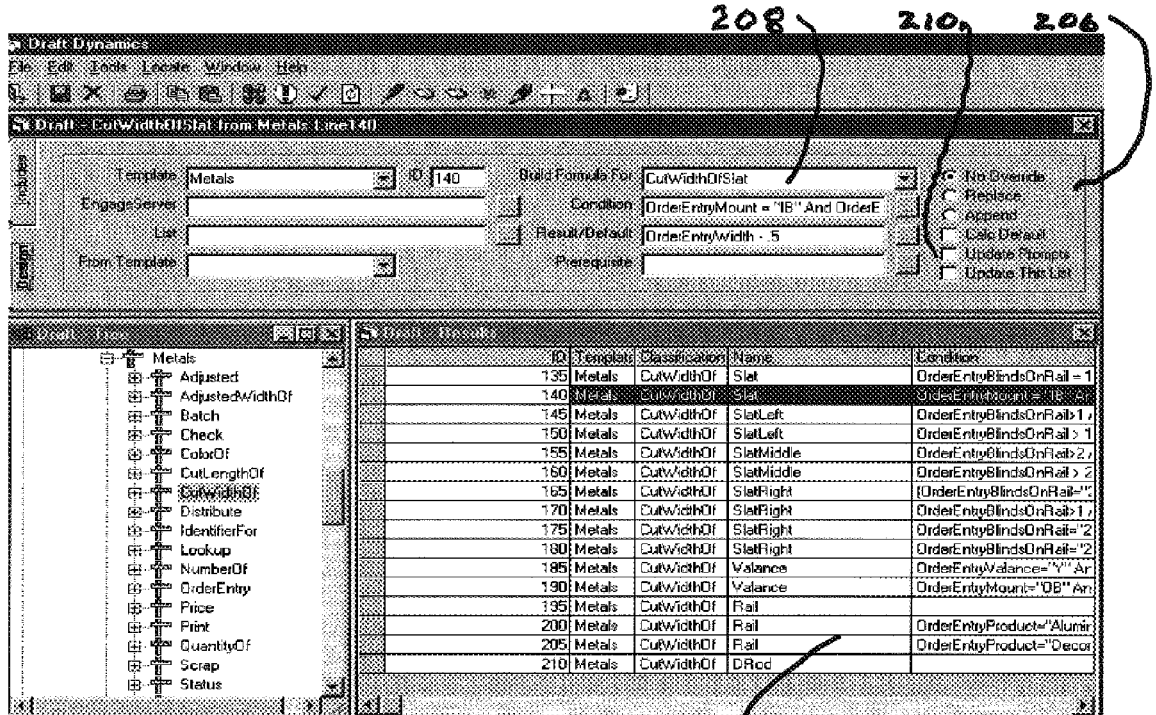
FIG. 9 is an exemplary screen shot of a SME interface of the modeler of FIG. 1 and illustrating a templates interface.

In FIG. 9, the SME uses the template interface 206 including, for example, blank entry or display spaces for the fields of the draft templates block 76 and the draft formulas block 88. The build formula for entry space 208 combines the name and classification fields 94 of the draft formulas block 88. The "update prompts" entry space 210 illustrates the yes/no entry value for the Boolean logic fields of update prompts 104 and update this list 110. Either the boxes are checked for yes or unchecked for no. The template interface 206 also provides a templates list 212 enabling the SME to view all templates and pivot the templates by different metadata features of the templates.

Figure 10:
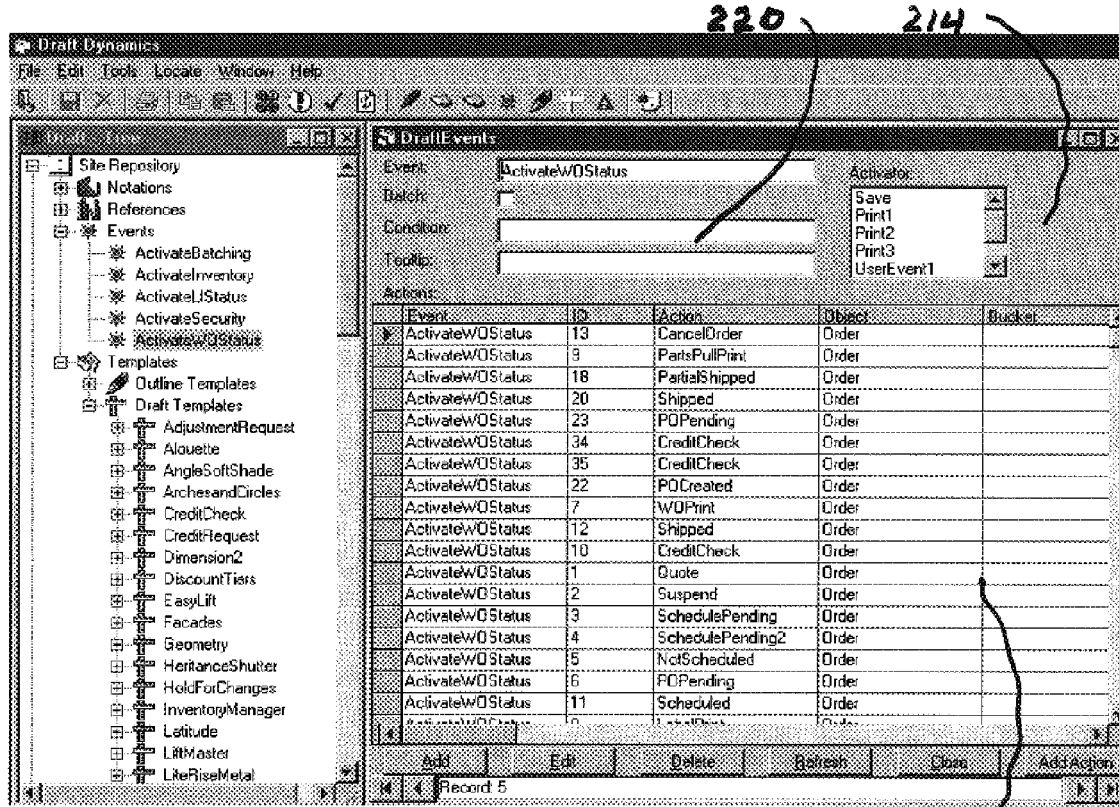
FIG. 10 is an exemplary screen shot of a SME interface of the modeler of FIG. 1 and illustrating an events interface.
Figure 11:
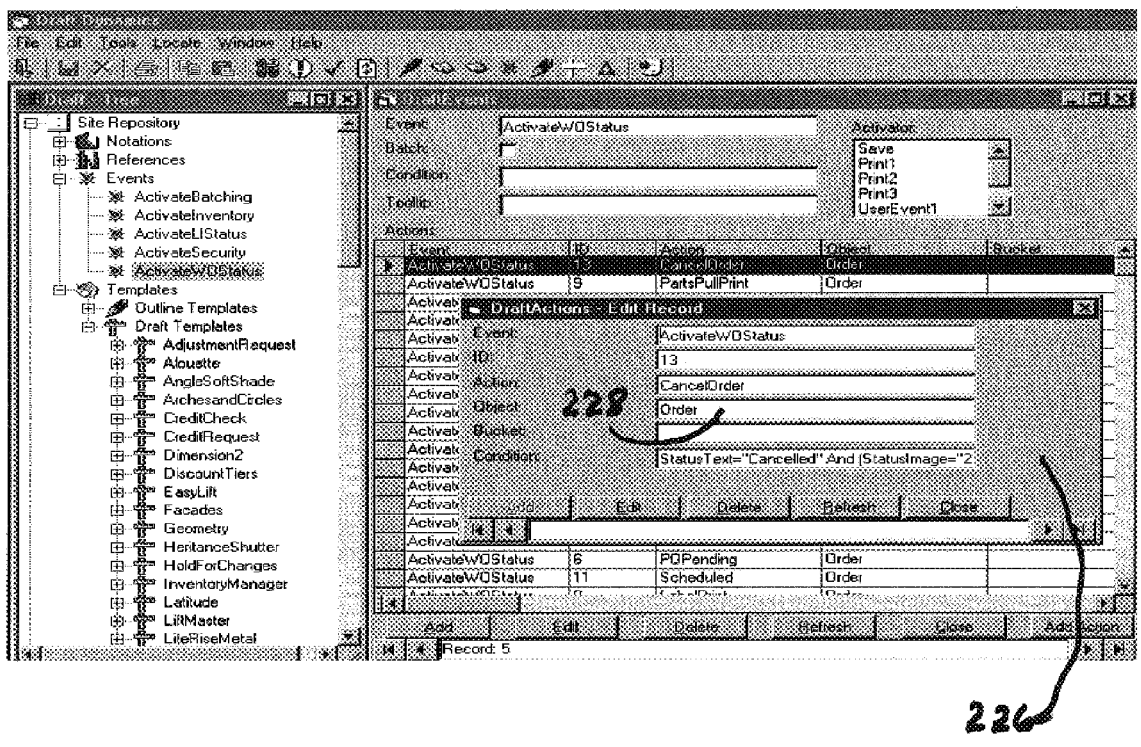
FIG. 11 is an exemplary screen shot of a SME interface of the modeler of FIG. 1 and illustrating an actions interface.

An events interface 214 is illustrated in FIG. 10 and corresponds to the draft events block 136. The events interface 214 guides the SME through entry of the actions such as work order print 216 or obtaining a quote 218 when a condition, entered into blank entry space 220, occurs. The event name 222 illustrated is Activate WO(work order) Status. Thus, the SME is enabled to name the event, set the condition for activation of the event, and select actions from the list 224 of previously entered actions or create new actions as illustrated in FIG. 11, which shows the draft actions interface 226. In the draft actions interface 226, which corresponds to the draft actions block 138, blank entry spaces are provided, for example, for the object 228 of the action.

Figure 12:
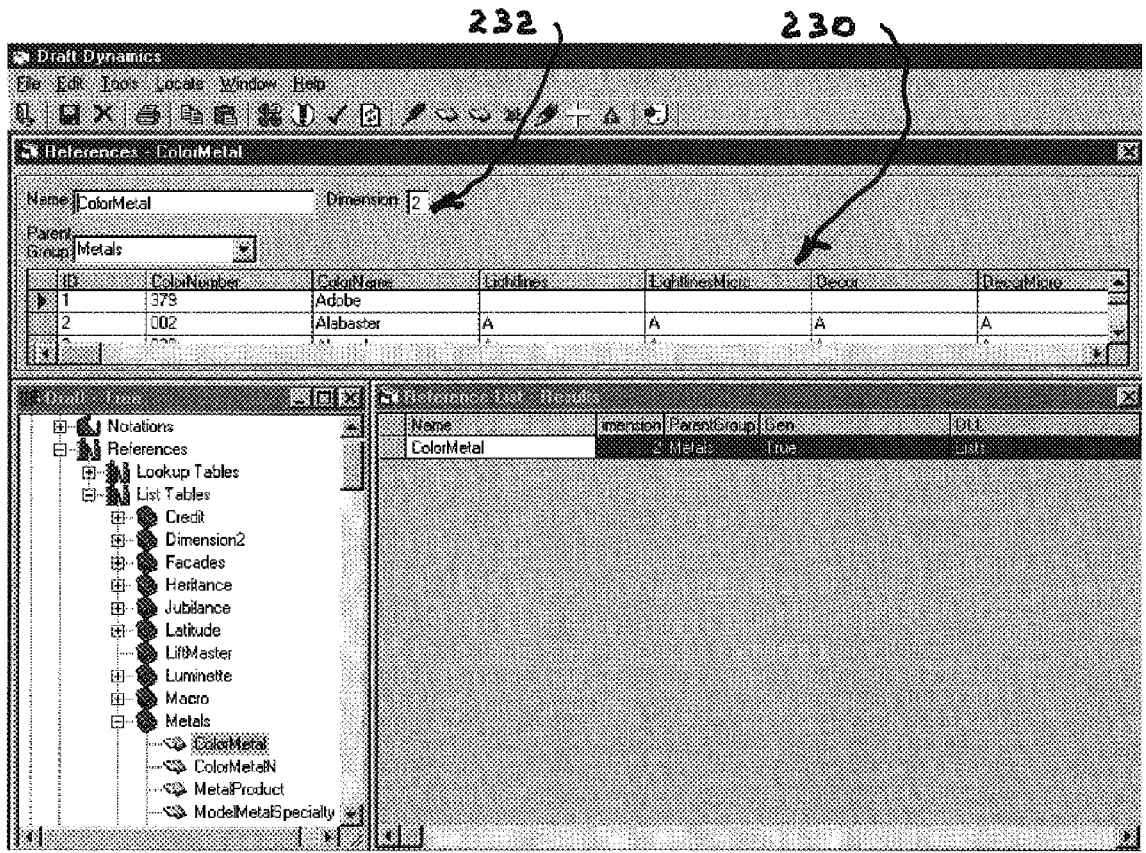
FIG. 12 is an exemplary screen shot of a SME interface of the modeler of FIG. 1 and illustrating a references interface.

A references interface 230 is illustrated in FIG. 12. The reference interface 230 enables the SME to enter the lookups and lists of data and includes, for example, a dimension blank entry space 232 corresponding to the dimension field 126 of the draft lookups block 116.

Figure 13A:
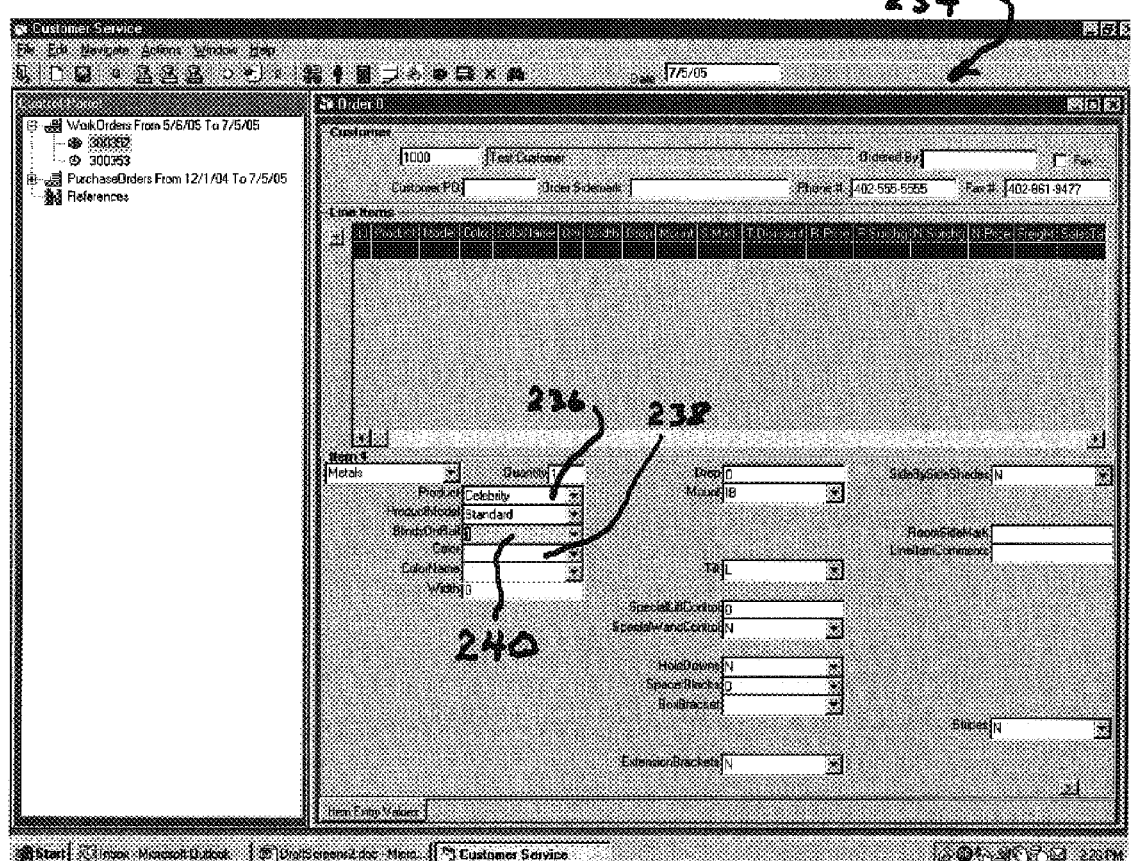
FIG. 13A is an exemplary screen shot of a user interface of the modeler of FIG. 1.
Figure 13B:
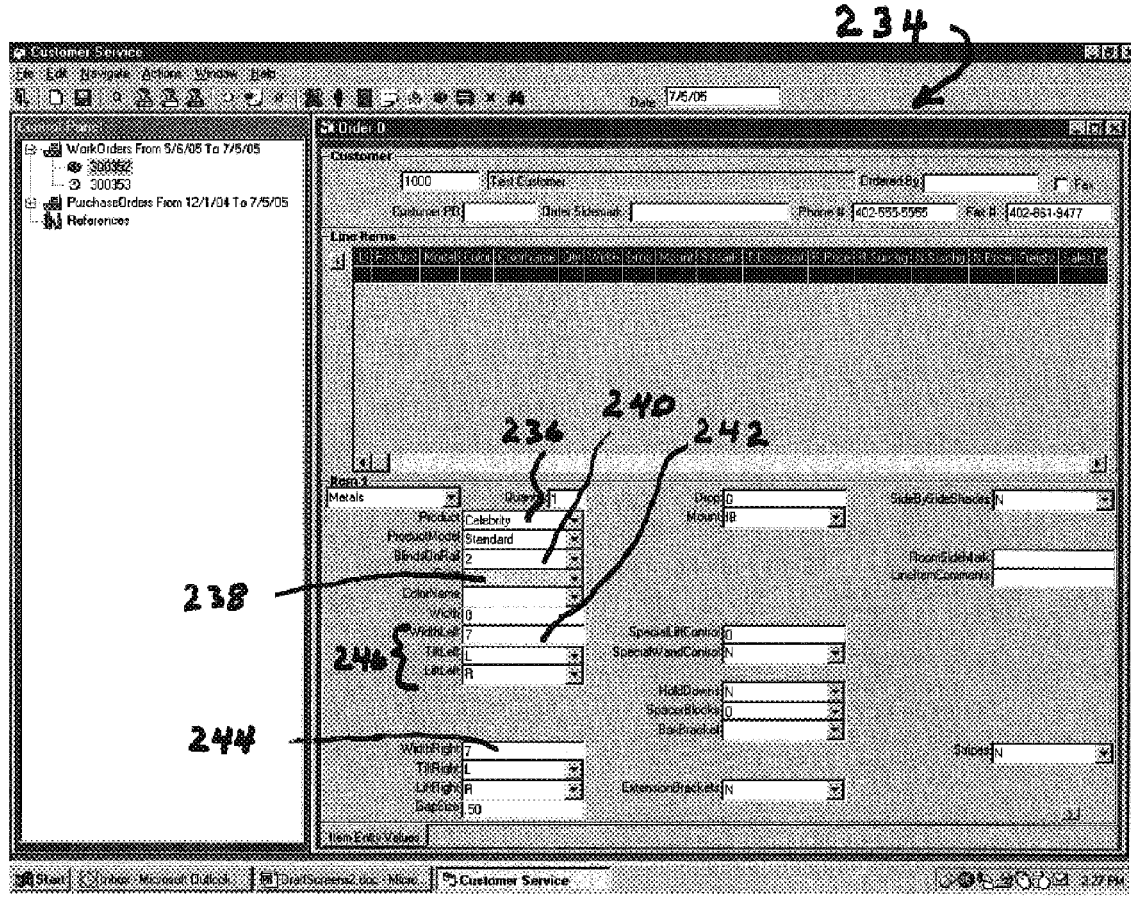
FIG. 13B is the exemplary screen shot of the user interface of FIG. 13A illustrating changes in the user interface based on information input by a user.

Referring to FIGS. 13A and 13B, after the SME has entered the rules and the automatically generated source code has been transferred to the production server 28, the user can utilize the modeled solution. In FIG. 13A, a user entry screen 234 is displayed on the user terminal 24. In this example, the customer has selected a Celebrity style of blind. When the user enters Celebrity into the product entry space 236, the class is instantiated, and the screen provides blank display spaces, such as color 238, for information needed about Celebrity style blinds. Several pull down menus and default values are also provided. One default value is, one (1) blind per rail in the "Blinds On Rail" entry space 240. If the user changes the number of blinds on the rail to three, as illustrated in FIG. 13B, ten additional blank entry spaces appear such as the width middle entry space 242. If the user had changed the blinds on rail value 240 to two (2), seven additional entry blanks would have appeared including width left 244. The middle entry spaces, collectively 246, would not appear. The change in the user interface occurs because the instantiation modeler 156 morphs the object based on the new information input by the user, and the user interface changes to reflect the more mature morphable object.

Figure 14A:
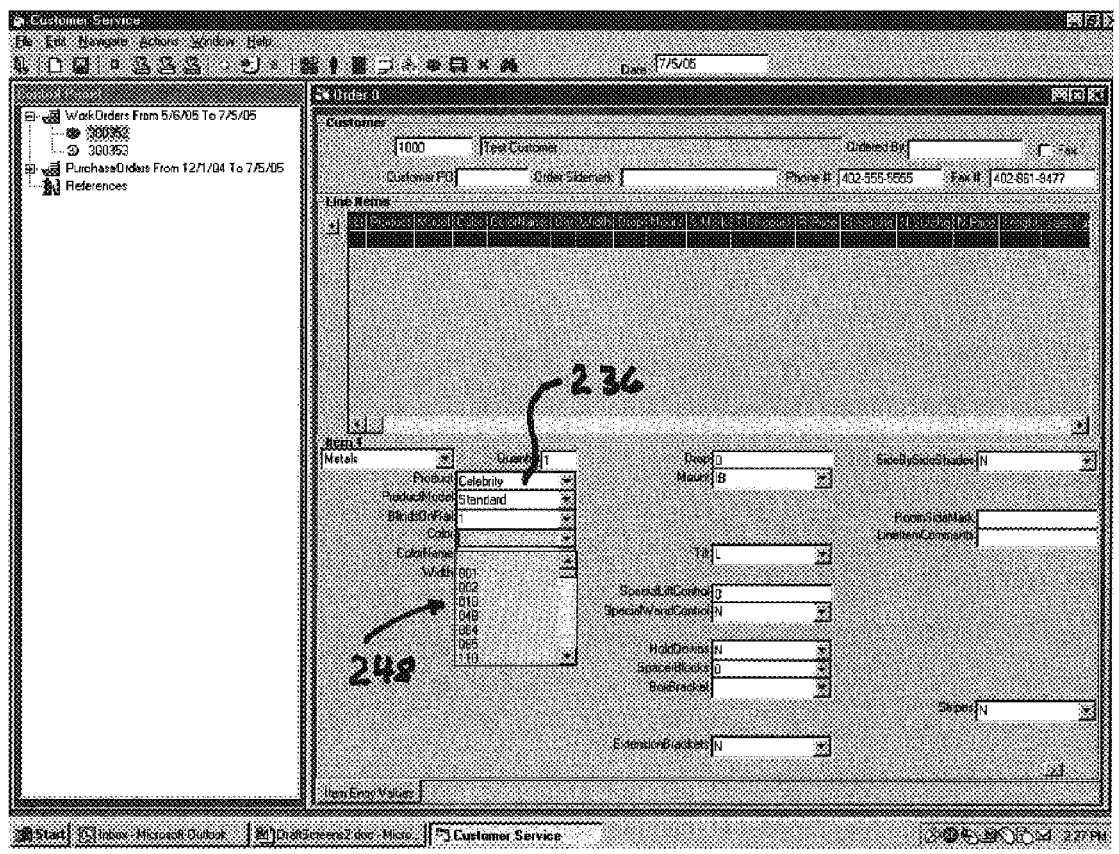
FIG. 14A is another exemplary screen shot of a user interface of the modeler of FIG. 1.
Figure 14:
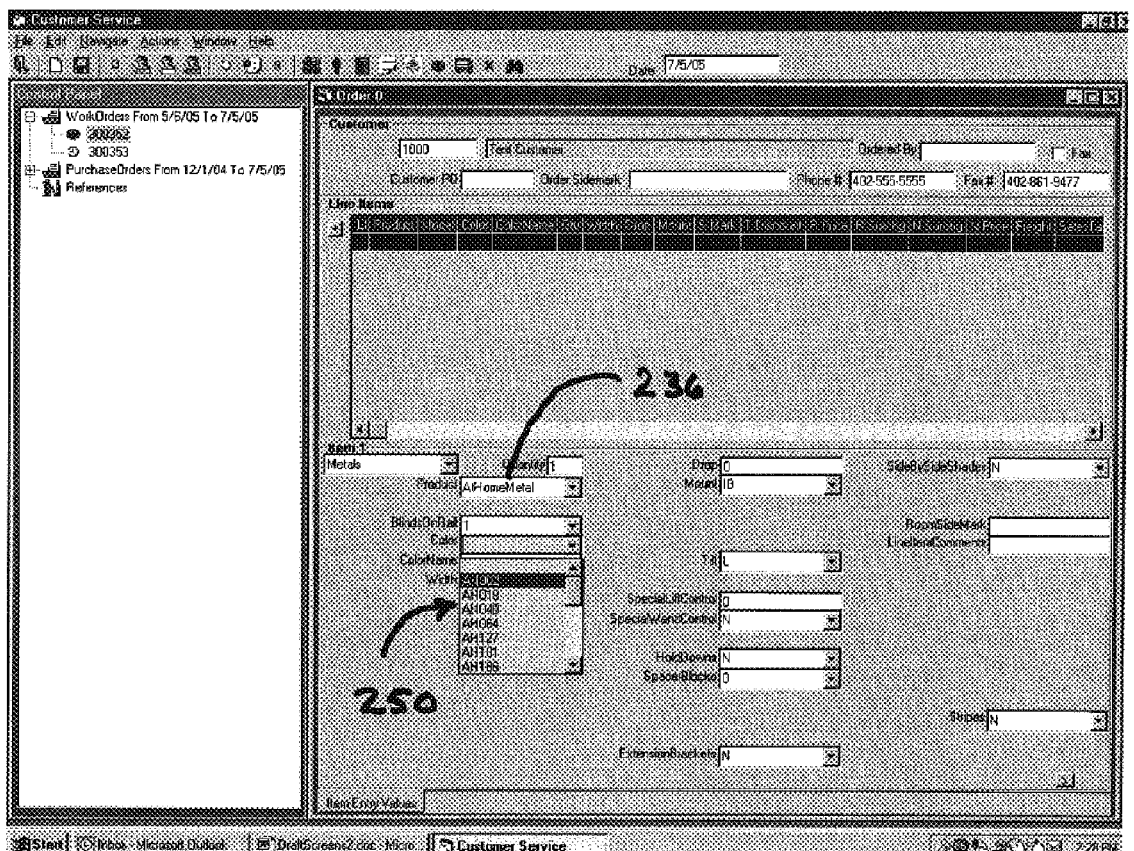
FIG. 14B is the exemplary screen shot of the user interface of FIG. 14A illustrating another type of change in the user interface based on information input by the user.

The user interface also changes by pulling in different pull down menus/windows as illustrated in FIGS. 14A and 14B. In FIG. 14A, the color pull down menu 248 is displayed for the Celebrity style in the product space 236. When the user enters a Metal Plain style in the product entry space 236, as illustrated in FIG. 14B, a different color pull down menu 250 is displayed from which the user can make a color selection. It is understood that these are only two examples of how the user interface changes as the object morphs in response to information input by the user. There are many other ways that the interface changes in the blinds example, and the invention contemplates that as SME in different fields enter rules for those respective fields, the objects and user interface will morph and change in ways originally unanticipated by the inventors. It should be further understood that the user and SME interface illustrated in the FIGS. 8 through 14 containing the actual interfaces, are exemplary. Thus, the invention contemplates many implementations of the user and SME interfaces.

The computer system 20 implements a draft database 62, fluid object material 50, and an instantiation modeler 156 according to the present invention to implement a modeler that goes beyond previous OOP concepts of abstraction, polymorphism, overloading, and metadata by moving these concepts to the program/run time level. Thus, the modeler is capable of modeling almost any solution process regardless of the extent and complexity of the solution process. While prior art programs simply apply preprogrammed code algorithms to data, the present invention is operable to actually develop the code algorithms for application to user information. Further, while prior art software programs would have to be re-coded by a software engineer to adapt to new rules, the SME is enabled to introduce new rules into the system, and the modeler develops new code algorithms for the new rules.

Thus, a modeler is disclosed which utilizes automatically coded morphable objects, which are automatically coded with the knowledge of a SME, to allow a user to interact with that knowledge to solve problems within the domain of that knowledge. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

Glossary

Backward Chaining: A goal centric solution strategy in which a solution/goal is assumed and the inference engine works backwards from that solution to determine if it is true. This strategy frequently requires the user to input additional information.

Boolean Logic: A form of algebra in which all values are reduced to either true or false. Thus, where a field has a Boolean entry value, the field requires a true/false or yes/no entry.

CASE—Computer Aided Software Engineering: A development environment for programming teams. CASE systems typically offer tools to automate, manage, and simplify the development process. CASE systems can include tools for summarizing initial requirements, developing flow diagrams, scheduling development tasks, preparing documentation, and developing program code framework.

Cell: A plurality of morphable objects operable to process independent variables.

Class: In object oriented programming, a class is a category of preinstantiated objects. The class defines the common properties of the preinstantiated objects that belong to it.

COM—Component Object Model: A model for binary code enabling programmers to develop objects that can be accessed by any COM compliant application.

Compile: The process of converting source code, which is meaningful to humans, to machine language (1's and 0's), which is meaningful to computers.

Context: A plurality of morphable objects operable to process dependent variables.

Database: A collection of information organized in such a way that a computer program can select desired pieces of data.

DBMS—Database Management System: A collection of programs that enables the storage modification and extraction of information from a database. A DBMS can organize information in a variety of ways, including relational, network, flat, and hierarchical.

Dependent Variable/Result Variable: A variable that depends on something else. It is a value that is calculated based on entry variables and other result variables.

DLL—Dynamic Link Library: A library of executable functions or data that can be used by Windows applications.

Double: A number that can include a decimal and have a larger number of digits on either side of the decimal point.

Expert System: A computer program containing stored knowledge and which is capable of solving problems and/or performing tasks in a specific field in a way similar to how a human expert would solve the problem or perform the task. Expert systems use forward and backward chaining or combinations of the two chaining strategies.

Field: A space allocated for a particular item of information.

Fluid: Something that is morphable, that is, capable of being readily changed or modified. More specifically, objects are fluid in that they are readily morphed as known information is added by a user to solve specific problems within the domain of a modeled solution process.

Forward Chaining: A data centric solution strategy in which a user inputs known information or data, and the inference engine works forward through a series of rules to arrive at a conclusion.

IDE—Integrated Development Environment: A programming environment integrated into an application.

Independent Variable/Entry Variable: A variable that does not depend on something else. It is a piece of data that is typically entered by a user into the system and does not need to be calculated.

Inference Engine: The portion of an expert system's code that applies the knowledge entered by the software engineer to the problem presented by a user.

Inheritance: Taking the characteristics of one process or object and transferring those characteristics to a second process or object, so that the characteristics do not need to be redefined for the second process or object.

Instance: An object that belongs to a particular class. For example, Nebraska is an instance of the class Midwestern States.

Instantiate: To create an instance of something, or to take a picture of something. Specifically, as objects morph, it is necessary to freeze/instantiate them at a moment in time and see what they are or what they contain at that moment in time in order to use them to control and guide the system automation. When an object is frozen, it is instantiated.

Integer: A whole number such as 5 but not a decimal 6.2.

LAN—Local Area Network: A computer network that spans a relatively small area typically in a single building or group of buildings.

Library: A collection of compiled objects that a program can use.

Long: Indicates that the field can receive numbers with larger numbers of digits.

Mapping: To make logical connection between two entities because programs cannot translate from human concepts to computer language (1's and 0's), they translate incrementally through a series of layers. Each layer basically contains the same amount of information as the layer above, but in a form somewhat closer to the form that the computer understands. This also refers to copying a set of objects from one place to another while preserving the objects' organization.

Metadata: Metadata describes, for example, how, when, and by whom a particular set of data was collected. It may also include identifiers for data, how data should be manipulated, and how data should be routed. Thus, metadata is simply data about data.

Object: In a traditional sense, an object is a self-contained entity that consists of both data and procedures to manipulate the data. More specific to the present invention, an object is an instantiated instance of a class.

OOP—Object Oriented Programming: A type of programming in which programmers define not only the data type of a data structure, but also the types of operations or functions that can be applied to the data structure. Thus, the data structure becomes an object that includes both data and functions.

OOPL—Object Oriented Programming Language: A programming language utilizing object oriented programming.

OS—Operating System: A software program which controls the operation of the computer system and other programs.

Overloading: A feature of programming languages that allow objects to have different meanings depending on the context. Overloading is a type of polymorphism.

Pivot: Sorting data and/or metadata by various characteristics.

Polymorphism: Generally, the ability to appear in many forms. In object-oriented programming, polymorphism refers to a programming language's ability to process objects differently depending on their data type or class. More specifically, it is the ability to redefine methods for derived classes.

Pop Up & Pull Down Menus/Window: A list of options that appears in response to an operator activating an icon or other selectable item or control for the window.

Recursion: Repeatedly processing metadata, data, processed metadata and/or processed data to obtain a result.

Record: A complete set of information. Records are composed of fields, each of which contains one item of information. A set of records constitutes a file.

Single: A number that can include a decimal.

SME—Subject Matter Expert: An individual or group of individuals with knowledge regarding a solution process to be modeled. The SME inputs knowledge on the back end of the computer system to model the solution process.

SQL—Structured Query Language: A standardized query language for requesting information from a database. SQL enables multiple users on a LAN to access the same database simultaneously.

SQL Server: Generically, any database or management system that can respond to queries from client machines formatted in the SQL language.

String: A series of characters manipulated as a group.

Template: Generally, a guide having blanks for the entry of information.

Topology: The shape or configuration of something such as a LAN or a collection of data.

User: An individual or group of individuals with information about a problem to be solved by a modeled solution process. The user inputs information on the front end of the computer system to interact with knowledge input by a SME and solve the problem.

VB—Visual Basic: A programming language and environment developed by MicroSoft providing a graphical programming environment for developing user interfaces. Although Visual Basic is not a true OOPL in the strictest sense, VB supports an object-oriented philosophy.

VPN—Virtual Private Network: A network that is constructed by using public wires to connect nodes. These systems use encryption and other security mechanisms to assure that only authorized users can access the network and that the data cannot be intercepted.

WAN—Wide Area Network: A computer network that spans a relatively large geographic area. Typically a WAN consists of two or more LAN's and may be connected through the public switch telephone network.

Wrapper: A software component that accompanies resources or other software for the purpose of improving communication between and maintaining separation between different software applications.

What is claimed is:

1. A computer readable medium containing instructions for enabling a subject matter expert to develop a custom software solution for a desired automation project including at least one solution process, comprising:
   a subject matter expert interface operative to enable the subject matter expert to enter and develop rules for modeling the solution process;
   fluid object material operable to develop a morphable object and source code based on the rules input through the subject matter expert interface; and
   a user interface based on the morphable object, and being operative to enable a user to enter known information into the morphable object for solving problems within the domain of the modeled solution process, said user interface changing in appearance in response to said user entered information.

2. The computer readable medium according to claim 1 further comprising a knowledge database operable to store the rules input through the subject matter expert interface, and wherein the subject matter expert interface is further operable, through the use of empty fields, to guide the subject matter expert through the entry of variables, templates, references, and events to develop the rules.

3. The computer readable medium according to claim 1 further comprising an instantiation modeler operable to instantiate and morph the morphable object as known information is entered by the user.

4. The computer readable medium according to claim 3 wherein the instantiation modeler is operable to repeatedly instantiate the morphable object as known information is entered by the user, the instantiation modeler is operable to morph the morphable object into progressively more mature morphable objects based on previously instantiated objects, and the user interface is operable to change based on the more mature instantiated object.

5. The computer readable medium according to claim 1 wherein the fluid object material is provided with a wrapper operable to permit a subject matter expert to pause operation and update rules.

6. The computer readable medium according to claim 5 wherein the subject matter expert interface is further operative to enable the subject matter expert to enter, develop, and change to, new and/or revised rules simultaneous with the user interface guiding the user through entry of known information, and the wrapper is operable to briefly pause operation while the morphable object is revised.

7. The computer readable medium according to claim 6 wherein the subject matter expert interface and fluid object material reside on a development server, and the user interface resides on a user terminal.

8. The computer readable medium according to claim 6 wherein the fluid object material is further operable to develop a revised morphable object based on the revised rules input through the subject matter expert interface, the user interface is further operable to revise based on the revised morphable object.

9. The computer readable medium according to claim 1 wherein the fluid object material is operable to develop a plurality of morphable objects forming coded cells and coded contexts, and further comprising an instantiation modeler operable to instantiate the morphable objects and morph the morphable objects based on known information input by the user and based on the coded cells and coded contexts.

10. The computer readable medium according to claim 1 wherein the fluid object material comprises plurality of abstraction levels.

11. The computer readable medium according to claim 1 wherein the fluid object material comprises at least five abstraction levels.

12. The computer readable medium according to claim 1 further comprising a code generator operable to generate source code implementing the fluid object material and the source code being based on the rules.

13. The computer readable medium according to claim 12 wherein the generated source code is complete.

14. The computer readable medium according to claim 12 wherein the code generator is further operable to generate source code implementing the fluid object material, the fluid object material including a plurality of morphable objects, and the code generator is still further operable to generate source code in separate segments.

15. The computer readable medium according to claim 12 further comprising a wrapper operable to transmit a compiled version of the source code from a development server to a production server.

16. The computer readable medium according to claim 1 wherein the fluid object material comprises a plurality of metadata levels.

17. The computer readable medium according to claim 1 wherein the morphable object is substantially completely comprised of metadata and processed metadata.

18. The computer readable medium according to claim 1 wherein the subject matter expert interface is further operable to guide the subject matter expert through the entry of variables and templates, and the subject matter expert interface provides a plurality of inheritance levels among templates.

19. The computer readable medium according to claim 1 wherein the subject matter expert interface is further operable to guide the subject matter expert through the entry of variables and templates, and the subject matter expert interface provides at least five of inheritance levels among templates.

20. A method for implementing automation in a computer system, the method comprising:
    enabling a subject matter expert to input rules;
    inputting rules;
    forming a knowledge database based on the rules;
    generating source code for a fluid object and creating a morphable object based on the rules; and
    enabling a user to input known information into the morphable object through a user interface, wherein appearance of said user interface varies in response to information input by said user.

21. The method according to claim 20 further comprising instantiating the morphable object when a piece of known information is input into the morphable object, and morphing the morphable object based on the piece of known information.

22. The method according to claim 20 further comprising repeatedly instantiating the morphable object as known information is input into the morphable object, and repeatedly morphing the morphable object based on the known information.

23. The method according to claim 22 wherein repeatedly instantiating the morphable object as known information is input into the morphable object and repeatedly morphing the object based on the known information comprise automatically repeatedly instantiating the morphable object as known information is input into the morphable object and automatically repeatedly morphing the object based on the known information.

24. The method according to claim 20 wherein forming a knowledge database based on the rules, developing the morphable object based on the rules, and enabling the user to input known information into the morphable object comprise automatically forming the knowledge database based on the rules, automatically developing the morphable object based on the rules, and automatically enabling the user to input known information into the morphable object.

25. The method according to claim 20 wherein forming a knowledge database based on the rules and developing the morphable object based on the rules comprise automatically forming the knowledge database based on the rules and automatically developing the morphable object based on the rules.

26. The method according to claim 20 wherein forming a knowledge database with the rules comprises automatically forming the knowledge database based on the rules.

27. The method according to claim 20 wherein developing the morphable object based on the rules comprises automatically developing the morphable object based on the rules.

28. The method according to claim 20 wherein enabling the user to input known information into the morphable object comprises automatically developing a dynamic user interface for input of known information.

29. The method according to claim 20 further comprising generating source code for implementing the fluid object material and the morphable object, and compiling the source code.

30. The method according to claim 29 wherein generating the source code comprises automatically generating the source code upon subject matter expert indication to generate.

31. The method according to claim 29 further comprising transmitting the compiled source code from a development server to a production server.

32. The method according to claim 31 further comprising implementing an instantiation modeler with the compiled source code, instantiating the morphable object when a piece of known information is input into the morphable object, and morphing the morphable object into a mature morphable object based on the piece of known information.

33. The method according to claim 32 further comprising morphing the mature morphable object when another piece of known information is input into the mature morphable object.

34. The method according to claim 32 further comprising repeatedly morphing the mature morphable object when additional pieces of known information are input into the mature morphable object.

35. The method according to claim 20 further comprising updating the rules in the knowledge database while the user inputs known information into the morphable object.

36. The method according to claim 35 further comprising generating and compiling revised source code for the updated rules, pausing operation of the user interface, updating a previous code with the revised code, and releasing the user interface for continued operation.

37. The method according to claim 20 wherein enabling a subject matter expert to input rules comprises enabling the subject matter expert to define a plurality of metadata points about a piece of data and define a plurality of metadata processes about the piece of data.

38. The method according to claim 37 wherein enabling a subject matter expert to input rules further comprises enabling the subject matter expert to define second level metadata points about the metadata points and to define third level metadata points about the second level metadata points.

39. The method according to claim 37 wherein one of the metadata points is an empty field for a piece of data.

40. A computer system comprising:
    a development server including fluid object material operable to develop a morphable object based on rules input through a subject matter expert interface;
    a subject matter expert terminal in operative communication with the development server, and the subject matter expert terminal including the subject matter expert interface which is operable to guide a subject matter expert through entry and development of the rules for modeling a solution process; and
    a user terminal in operative communication with the development server, and the user terminal including a user interface based on the morphable object, and being operative to guide a user through entry of known information into the morphable object for solving problems within the domain of the modeled solution process.

41. The computer system according to claim 40 further comprising a production server in operative communication with the development server and the user terminal, such that the production server is interposed between the development server and the user terminal, and the production server including an instantiation modeler operable to instantiate the morphable object as known information is entered by the user.

42. The computer system according to claim 41 further comprising a plurality of user terminals in operative communication with the production server, a plurality of subject matter expert terminals in operative communication with the development server, and a wherein the operative communication between the development server and the production server is through a local area network.

43. The computer system according to claim 40 wherein the development server further includes a knowledge database operable to store the rules input through the subject matter expert interface.

44. A method for enabling implementation of automation, the method comprising:
    enabling a subject matter expert to input rules;
    enabling automatic formation of a knowledge database based on the rules;
    enabling automatic development of a morphable object based on the rules; and
    enabling a user to input known information into the morphable object.

45. The method according to claim 44 further comprising enabling instantiation of the morphable object when a piece of known information is input into the morphable object, and enabling morphing of the morphable object based on the piece of known information.

46. The method according to claim 45 wherein enabling morphing comprises enabling morphing by pulling in a list and enabling morphing by retrieving a look up value.

47. The method according to claim 45 wherein enabling morphing comprises enabling morphing by evaluating a prerequisite and by adding an information request based upon the prerequisite being met.

48. The method according to claim 44 wherein enabling the subject matter expert to input rules comprises enabling the subject matter expert to input data routings.

49. The method according to claim 48 wherein enabling the subject matter expert to input data routings comprises enabling the subject matter expert to input data routings based on metadata.

50. A method for generating code, the method comprising:
    directing a subject matter expert through the entry of rules;
    forming a knowledge database based on the rules;
    developing a plurality of morphable objects based on the rules; and
    generating code based on the morphable objects.

51. The method according to claim 50 wherein directing the subject matter expert through the entry of rules comprises directing the subject matter expert with empty fields, and developing the plurality of morphable objects comprises developing the plurality of morphable objects and forming coded cells and coded contexts.

52. A method in a computing environment for automated generation of program solutions for at least one process, the method comprising:
    providing an interface for a subject matter expert to develop a plurality of rules for modeling the at least one process;
    providing a code generator to generate source code to implement a fluid object material, wherein said fluid object material is developed utilizing one or more of said plurality of rules;
    providing an instantiation modeler to utilize said fluid object and instantiate one or more morphable objects, wherein said morphable objects are utilized in a user interface;
    wherein said morphable objects respond to information provided by a user and change the display of said user interface during execution of the program solutions.

53. The method as recited in claim 52 wherein said plurality of rules may be revised by a subject matter expert, wherein revising said plurality of rules morphs said one or more morphable objects, and wherein the morphed one or more morphable objects change the appearance of said user interface.

54. The method as recited in claim 52 wherein the fluid object material comprises a plurality of abstraction levels.

55. The method as recited in claim 52 wherein said code generator is operable to generate source code in separate segments.

* * * * *